United States Patent
Maeda et al.

(10) Patent No.: US 6,594,412 B2
(45) Date of Patent: Jul. 15, 2003

(54) OPTICAL ADD/DROP DEVICE

(75) Inventors: Takuji Maeda, Kawasaki (JP); Satoshi Kuroyanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/957,142

(22) Filed: Sep. 20, 2001

(65) Prior Publication Data

US 2002/0118913 A1 Aug. 29, 2002

(30) Foreign Application Priority Data

Feb. 28, 2001 (JP) .................. 2001-055622

(51) Int. Cl.⁷ .................................. G02B 6/26
(52) U.S. Cl. ........................................ 385/17
(58) Field of Search ............. 359/127, 227, 359/230, 233, 236, 128, 124, 119, 132, 156, 246, 251; 385/17, 18, 19, 33, 34, 36

(56) References Cited

U.S. PATENT DOCUMENTS 6,154,585 A  * 11/2000  Copner et al. .......... 359/124
6,215,919 B1 *  4/2001  Li et al. ................. 385/16
6,222,656 B1 *  4/2001  Eu ........................ 359/127
6,353,692 B1 *  3/2002  Colbourne .............. 385/16

FOREIGN PATENT DOCUMENTS

JP     11-225111     * 8/1999 ............... 385/24

* cited by examiner

*Primary Examiner*—Akm Enayet Ullah
(74) *Attorney, Agent, or Firm*—Katten Muchin Zavis Rosenman

(57) ABSTRACT

Disclosed herein is an optical add/drop device applicable to an optical fiber network. This device includes a plurality of 2×2 switch elements (SE) provided on crosspoints arranged in the form of a matrix. Each of the switch elements switches between a bar state and a cross state. This device further includes input/output ports provided on the rows of the matrix and connected to the optical fiber network, and add/drop ports provided on the columns of the matrix. With this configuration, failure restoration can be easily performed with a simple configuration.

9 Claims, 26 Drawing Sheets

DIVERSE SWITCHING AT NODES #1 AND #4

PROTECTION LINE

A : BLSR (LOOP-BACK SWITCHING)
B : U(B)PSR (DIVERSE SWITCHING)
C : LOOP-BACK SWITCHING AT NODE #1

SIMULTANEOUS OPERATION OF BPSR (DIVERSE SWITCH) AND BLSR (LOOP-BACK SWITCH)

B : SPAN SWITCHING

FAILURE RESTORATION

OPTICAL ADD/DROP DEVICE

BACKGROUND OF THE INVENTION

1. Field of the Invention

The present invention relates to an optical add/drop device, and more particularly to an optical add/drop device suitable for wavelength division multiplexing (WDM) communication network.

2. Description of the Related Art

With the recent extension of data communications primarily including Internet, a rapid increase in traffic has started and it is expected that the trend of such a traffic increase will further continue in the future. In response to this traffic increase, a network having a hitherto unattained large capacity is required, and the construction of an optical communication network is proceeding to meet this requirement.

It is desired to use a transmission device adapted to a WDM communication network. For example, it is required to introduce a WDM-adapted device capable of processing a large-capacity signal into a node.

On the other hand, a ring topology relatively easy to control and usable on the scale of a small-sized switch is now introduced in small- to medium-scale networks. In the future, it will be tried to expand such a ring topology up to the form of a chain and thereby to cover a wide area. In this respect, the improvement in an optical add/drop device used as a node is desired in order to improve the reliability of a network and effect an efficient and economical operation of the network.

In a conventional optical add/drop device known in the art, an optical demultiplexer and an optical multiplexer are used to establish wavelength channels in each line, and a switch unit is used per wavelength channel to perform switching of optical paths. For example, the switch unit is configured by arranging a plurality of 2×2 switch elements in the form of a matrix.

Each 2×2 switch element can switch between a bar state and a cross state. Examples of such a 2×2 switch element include an optical waveguide type switch element and a reflection type switch element such as a mirror using MEMS (Micro Electro Mechanical System).

In considering optical path switching upon failure restoration in a ring network or the like, there is a problem that the number of switch elements in an optical add/drop device increases to cause a complex configuration of the device. Furthermore, there are various modes of responding to the optical path switching upon failure restoration, and it is accordingly desired to prepare an optical add/drop device capable of supporting these various modes.

SUMMARY OF THE INVENTION

It is therefore an object of the present invention to provide an optical add/drop device which can easily perform failure restoration with a simple configuration.

In accordance with an aspect of the present invention, there is provided an optical add/drop device applicable to an optical fiber network. This device comprises a plurality of 2×2 switch elements provided on crosspoints arranged in the form of a matrix, each of said switch elements switching between a bar state and a cross state; input/output ports provided on the rows of said matrix and connected to said optical fiber network; and add/drop ports provided on the columns of said matrix.

With this configuration, in the case of applying this optical add/drop device to a ring network, for example, failure restoration can be easily performed. Further, the configuration of the optical add/drop device can be simplified through various preferred embodiments of the present invention.

Preferably, said matrix comprises a 4×4 matrix.

In this case, said add/drop ports comprise two add input ports opposed to said switch elements in the first row, the first column and in the first row, the second column; and two drop output ports opposed to said switch elements in the fourth row, the first column and in the fourth row, the second column.

Further, said optical fiber network comprises a first work line, a second work line opposite in direction of said first work line, a first protection line, and a second protection line opposite in direction to said first protection line. Said input/output ports comprise four input ports opposed to said switch elements in the first row, the first column, in the second row, the first column, in the third row, the first column, and in the fourth row, the first column, and connected to said first work line, said second work line, said first protection line, and said second protection line, respectively; and four output ports opposed to said switch elements in the first row, the fourth column, in the second row, the fourth column, in the third row, the fourth column, and in the fourth row, the fourth column, and connected to said first work line, said second work line, said first protection line, and said second protection line, respectively. All of said switch elements in the first, second, and third columns are oriented in a first direction, and all of said switch elements in the fourth column are oriented in a second direction different from said first direction.

In accordance with another aspect of the present invention, there is provided an optical add/drop device applicable to an optical fiber network for propagating WDM signal light obtained by wavelength division multiplexing a plurality of optical signals having different wavelengths. This device comprises an optical demultiplexer and an optical multiplexer for relating said optical fiber network to a plurality of wavelength channels; and a plurality of switch units provided so as to respectively correspond to said plurality of wavelength channels. Each of said switch units comprises a plurality of 2×2 switch elements provided on crosspoints arranged in the form of a matrix, each of said switch elements switching between a bar state and a cross state; input/output ports provided on the rows of said matrix and connected to said optical fiber network; and add/drop ports provided on the columns of said matrix.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
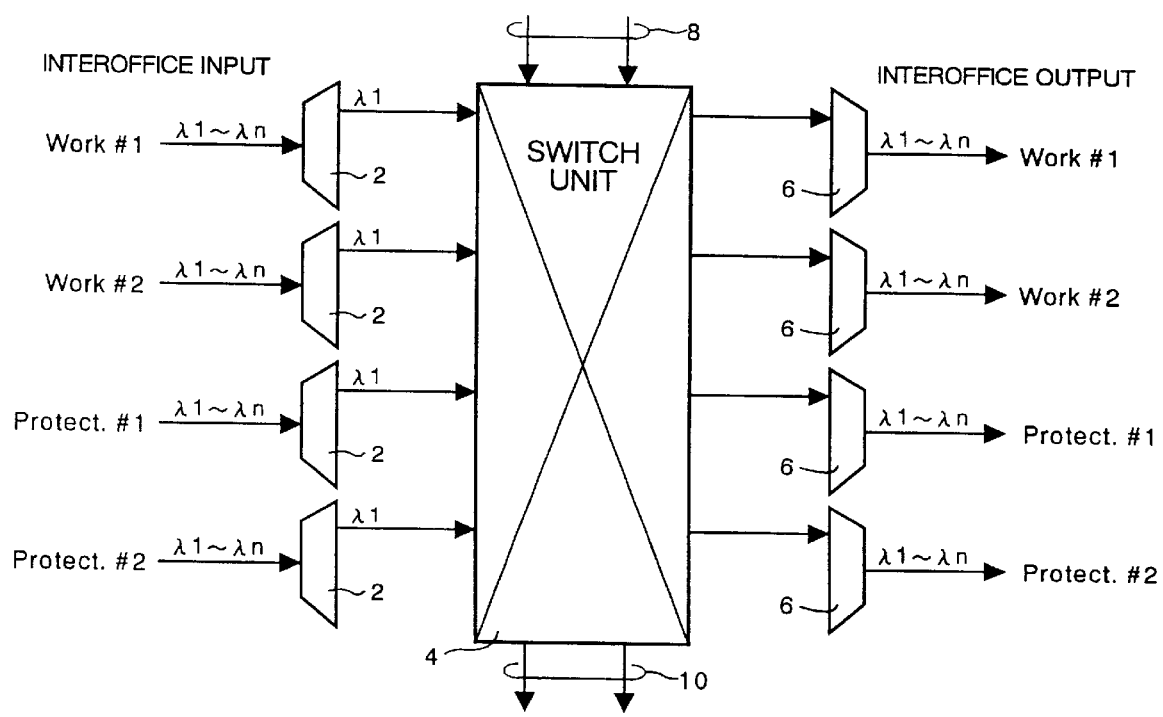
FIG. 1 is a block diagram showing a first preferred embodiment of the optical add/drop device according to the present invention.

FIG. 1 is a block diagram showing a first preferred embodiment of the optical add/drop device according to the present invention. This device is adapted to two work lines (Work #1 and Work #2) and two protection lines (Protect. #1 and Protect. #2). A pair of optical demultiplexer 2 and optical multiplexer 6 are provided for each line. That is, four optical demultiplexers 2 and four optical multiplexers 6 are totally provided.

Each optical demultiplexer 2 couples wavelength channels of wavelengths $\lambda_1$ to $\lambda_n$ (n is a natural number) wavelength division multiplexed in the corresponding line to its n output ports respectively corresponding to the wavelength channels ($\lambda_1$ to $\lambda_n$). On the other hand, each optical multiplexer 6 couples its n input ports respectively corresponding to the wavelength channels ($\lambda_1$ to $\lambda_n$) to the wavelength channels in the corresponding line.

When WDM signal light obtained by wavelength division multiplexing a plurality of optical signals having the wavelengths $\lambda_1$ to $\lambda_n$ is input from each line to the corresponding optical demultiplexer 2, the optical signals of the wavelength channels ($\lambda_1$ to $\lambda_n$) are output from the n output ports of the optical demultiplexer 2, respectively. These optical signals output from the optical demultiplexer 2 are subjected to processing such as optical path switching by a switch unit 4, and next output through any desired one of the optical multiplexers 6 to the corresponding line.

The switch unit 4 is provided with add ports 8 and drop ports 10, so as to perform add/drop operations. While the switch unit 4 shown in FIG. 1 is provided for the wavelength channel of the wavelength $\lambda_1$ for simplicity of illustration, a plurality of switch units 4 respectively corresponding to the n wavelength channels are actually provided.

Figure 2:
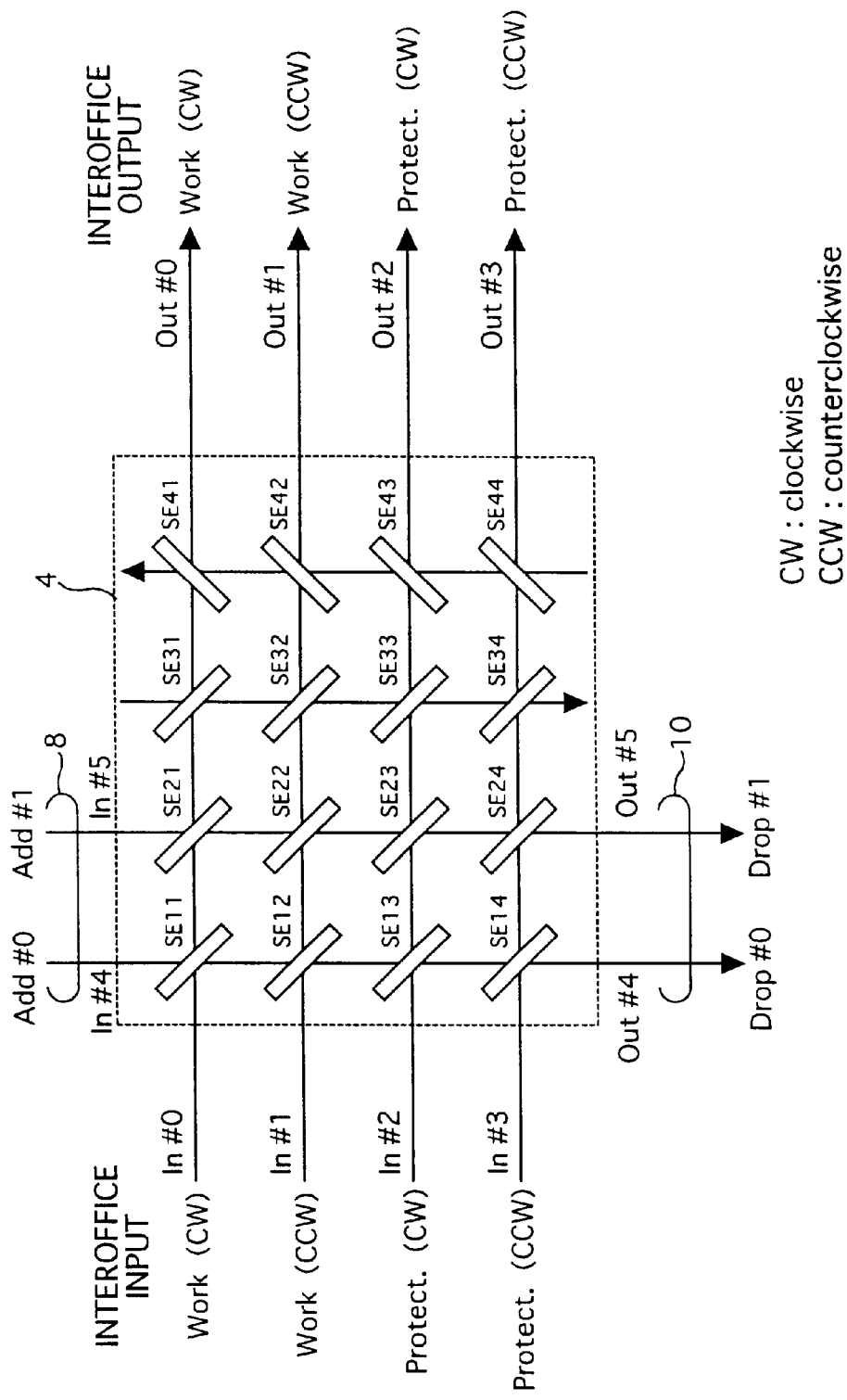
FIG. 2 is a block diagram showing a first preferred embodiment of a switch unit shown in FIG. 1.

Referring to FIG. 2, there is shown a first preferred embodiment of the switch unit 4. In this preferred embodiment, the switch unit 4 has 16 switch elements SEij (i, j=1, 2, 3, 4) at 4×4 crosspoints equally spaced from each other, where i represents the column counted from the left side in FIG. 2 and j represents the row counted from the upper side in FIG. 2. When each switch element appears at the corresponding crosspoint, a reflection path is set, whereas when each switch element disappears from the corresponding crosspoint, a transmission path is set. Accordingly, each switch element functions as a 2×2 optical switch for switching between a cross state and a bar state.

As shown in FIG. 2, the switch elements SE11 to SE14 in the first column, the switch elements SE21 to SE24 in the second column, and the switch elements SE31 to SE34 in the third column are inclined upward to the left, and the switch elements SE41 to SE44 in the fourth column are inclined upward to the right.

Four input ports In #0 to In #3 are set on the left side of the switch elements SE11 to SE14 so as to be opposed thereto, respectively. Similarly, four output ports Out #0 to Out #3 are set on the right side of the switch elements SE41 to SE44 so as to be opposed thereto, respectively. Further, two input ports In #4 and In #5 are set on the upper side of the switch elements SE11 and SE21 so as to be opposed thereto, respectively. Similarly, two output ports Out #4 and Out #5 are set on the lower side of the switch elements SE14 and SE24 so as to be opposed thereto, respectively.

The input ports In #0 to In #3 are used as interoffice inputs. That is, the input ports In #0, In #1, In #2, and In #3 are connected to the work line Work #1 (clockwise), the work line Work #2 (counterclockwise), the protection line Protect. #1 (clockwise), and the protection line Protect. #2 (counterclockwise), respectively.

The output ports Out #0 to Out #3 are used as interoffice outputs. That is, the output ports Out #0, Out #1, Out #2, and Out #3 are connected to the work line Work #1 (clockwise), the work line Work #2 (counterclockwise), the protection line Protect. #1 (clockwise), and the protection line Protect. #2 (counterclockwise), respectively.

The input ports In #4 and In #5 are used to input add signals from a given office. That is, the input ports In #4 and In #5 are connected to add lines Add #0 and Add #1, respectively. The output ports Out #4 and Out #5 are used to output drop signals to a given office. That is, the output ports Out #4 and Out #5 are connected to drop lines Drop #0 and Drop #1, respectively.

With this configuration, a failure restoration function and a path cross-connection function both required by a ring network can be realized with the same number of elements as that of a 4×4 crosspoint switch.

In the switch unit 4 shown in FIG. 2, a clockwise work signal is input to the input port In #0, and a counterclockwise work signal is input to the input port In #1. A clockwise protection signal is input to the input port In #2, and a counterclockwise protection signal is input to the input port In #3. Further, a signal to be added at this node is input from the input port In #4 or In #5. A signal to be dropped at this node is output from the output port Out #4 or Out #5.

When the switch element at each crosspoint is set to the cross state, a signal to be passed through this node becomes a through condition, and this signal from the interoffice input is output to the interoffice output. In contrast, when any one of the switch elements in the first column or in the second column is changed to the bar state, a signal to be added or dropped at this node becomes an add/drop condition, and this signal from each add port 8 is output to the interoffice output, or this signal from the interoffice input is output to each drop port 10. Thus, a desired signal can be added/dropped.

When a failure occurs, predetermined switch elements in the first to fourth columns are set to the cross state or the bar state to thereby allow switching from a predetermined protection line to a drop line or a work line. Further, switching from a work line to a protection line is also allowed. Further, by changing the switching state of any switching element to the cross state or the bar state according to the condition of the failure, an input from each add port 8 can be output through a work line to a protection line.

Figure 3:
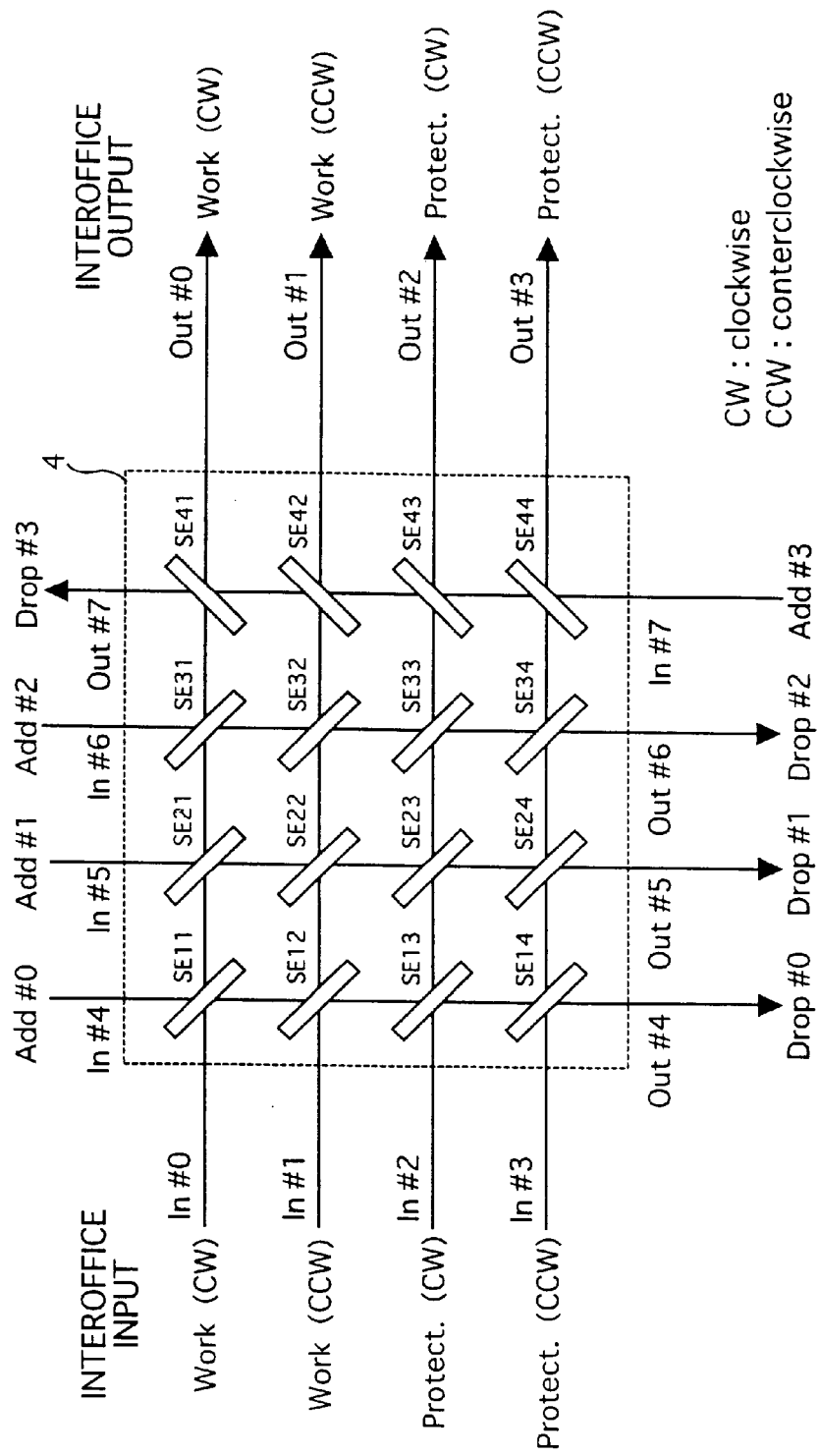
FIG. 3 is a block diagram showing a second preferred embodiment of the switch unit.

Referring to FIG. 3, there is shown a second preferred embodiment of the switch unit 4. In this preferred embodiment, two additional input ports In #6 and In #7 and two additional output ports Out #6 and Out #7 are set for add/drop operations. As viewed in FIG. 3, the input port In #6 is opposed to the upper side of the switch element SE31, the input port In #7 is opposed to the lower side of the switch element SE44, the output port Out #6 is opposed to the lower side of the switch element SE34, and the output port Out #7 is opposed to the upper side of the switch element SE41.

The input ports In #6 and In #7 are connected to add lines Add #2 and Add #3 from a given office, respectively, and the output ports Out #6 and Out #7 are connected to drop lines Drop #2 and Drop #3 to a given office, respectively.

With this configuration, the input ports In #6 and In #7 and the output ports Out #6 and Out #7 can be used as extra traffic. Accordingly, variations can be given to the failure restoration function, the path cross-connection function, and so on.

For example, in the case of utilizing the input ports In #6 and In #7 and the output ports Out #6 and Out #7 to switch signals on the extra traffic, a signal to be added or dropped can be easily selected by operating any switch elements in the third column and the fourth column.

There will now be described path setting in an initial condition and path routing upon failure restoration in a ring network with reference to FIGS. 4A, 4B, and 5.

Figure 4:
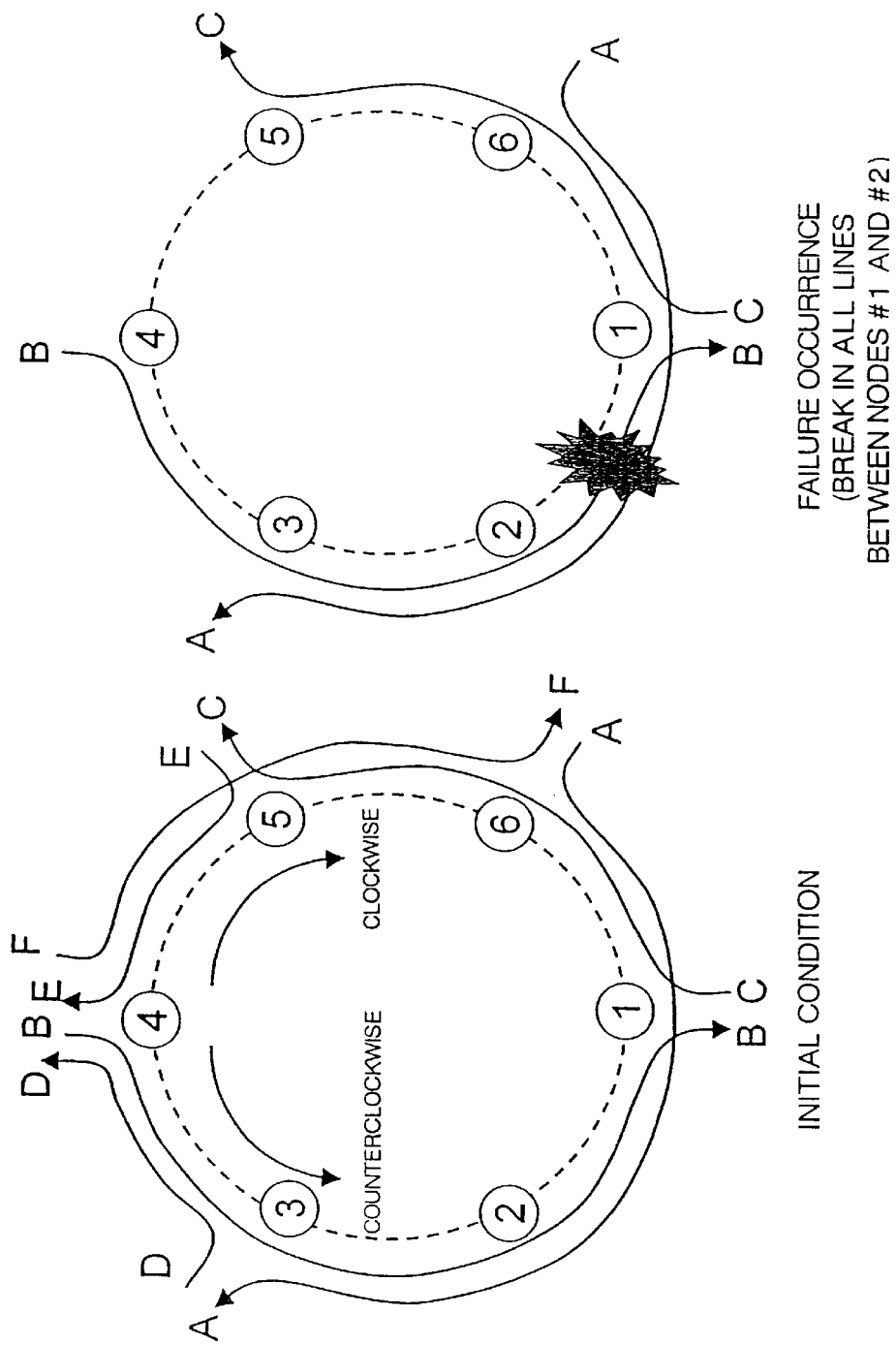
FIG. 4A is a schematic diagram showing the routes of paths set in an initial condition.
FIG. 4B is a schematic diagram showing the occurrence of a failure in the routes shown in FIG. 4A.

As shown in FIG. 4A, six nodes #1 to #6 each used as an ADM (add/drop multiplexer) are arranged in the form of a ring, and six paths A to F are set in relation to the nodes #1 to #6 in the initial condition. It is now assumed that a failure occurs between the node #1 and the node #2 to cause a break both in the work lines (clockwise and counterclockwise) and in the protection lines (clockwise and counterclockwise) as shown in FIG. 4B. In this case, a switching operation for failure restoration is performed in each node. For example, by performing loop-back switching such as BLSR (Bidirectional Lineback Switched Ring) or path-end switching (diverse switching) such as UPSR (Unidirectional Path Switched Ring) in the Bellcore/ITU-T standard, failure restoration routes as shown in FIG. 5 are set. In FIG. 5, only the paths changed in route by the failure restoration are especially shown.

Figure 6:
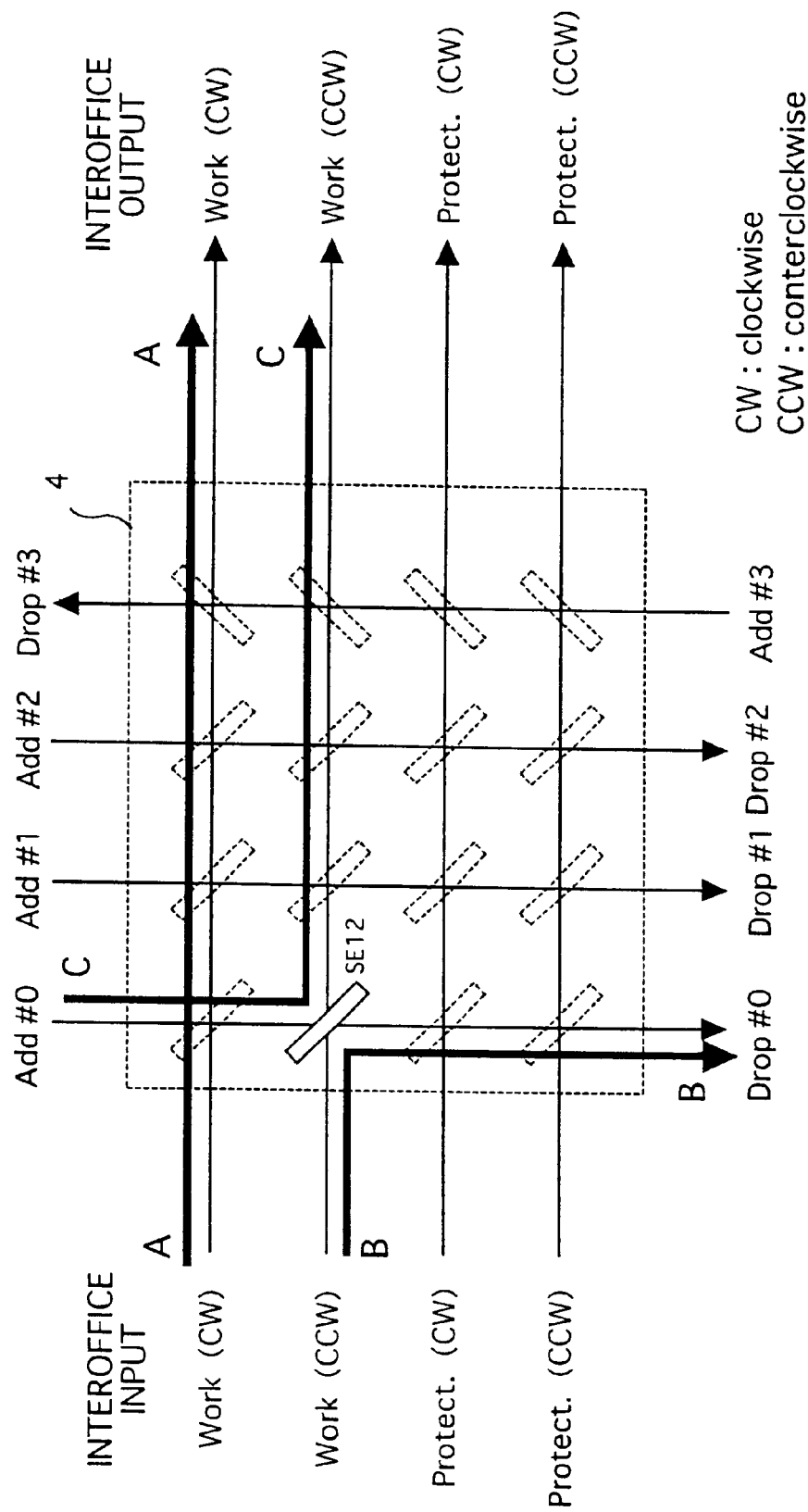
FIG. 6 is a block diagram for illustrating the operation of the switch unit in the initial condition in a node #1 shown in FIG. 4A.

FIG. 6 shows a condition of the switch elements in the switch unit 4 at the node #1 in the initial condition before the occurrence of a failure. At the node #1, the path A is set to a through path, and the path B is set to a drop path. In this case, this path setting can be made by setting only the switch element SE12 to the bar state.

Figure 7:
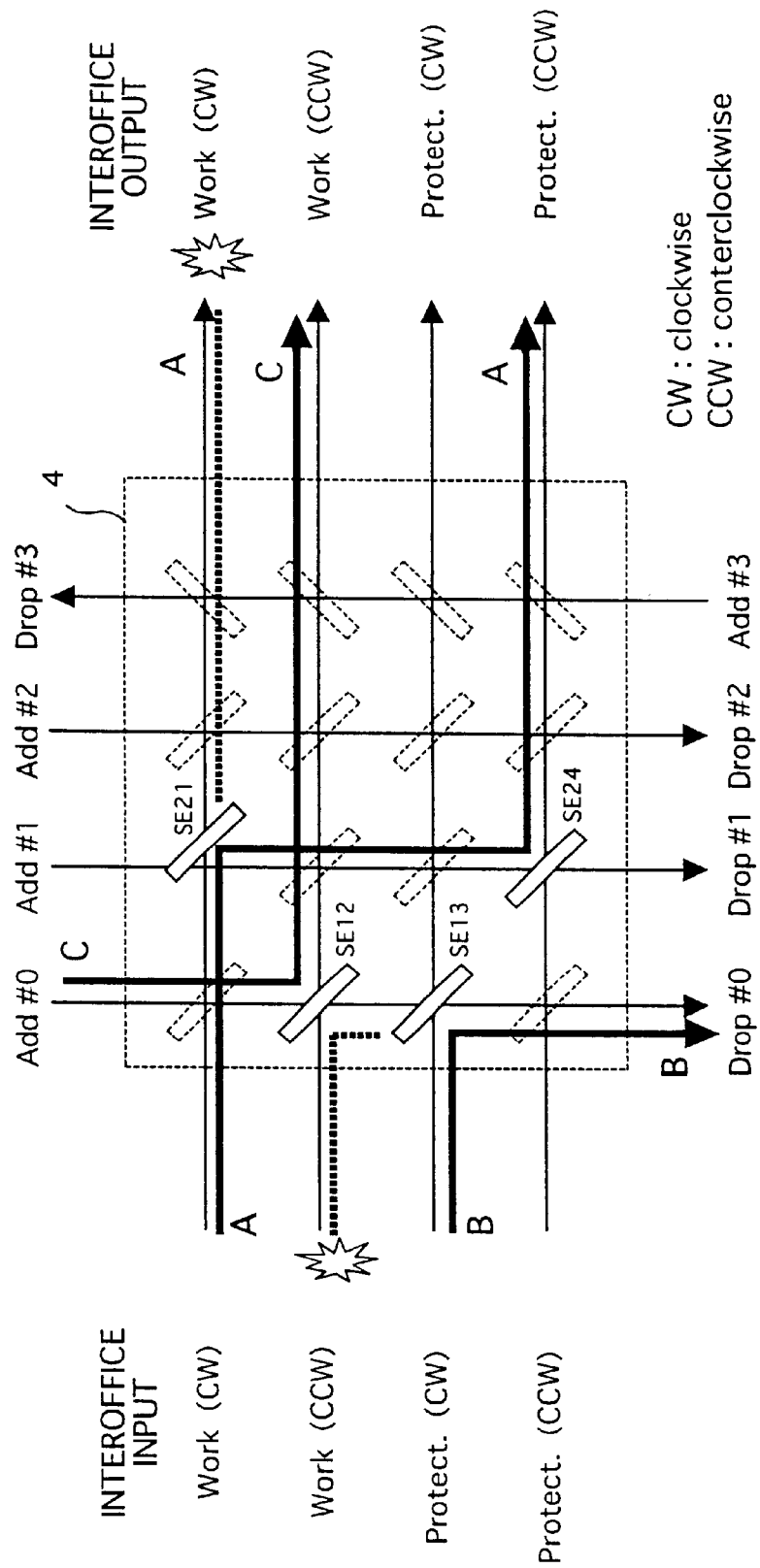
FIG. 7 is a block diagram similar to FIG. 6, showing failure restoration.

FIG. 7 shows a condition of the switch unit 4 at the node #1 after the occurrence of a failure and the required failure restoration. In this case, the switch elements SE12, SE13, SE21, and SE24 are set to the bar state.

With respect to the node #1, a failure occurs in the clockwise work line on the output side of the node #1, and a failure occurs in the counterclockwise work line on the input side of the node #1. As the restoration from the former failure, the output to the clockwise work line is switched to the output to the counterclockwise protection line for the path A. This switching corresponds to the loop-back switching operation.

As the restoration from the latter failure, the path B is switched from the counterclockwise work line to the clockwise protection line at the node #4 opposed to the node #1. At the node #1, a signal from the clockwise protection line is received and dropped. This switching corresponds to the path-end switching operation.

Thus, different failure restoration methods are simultaneously carried out for different paths at the node #1.

Figure 8:
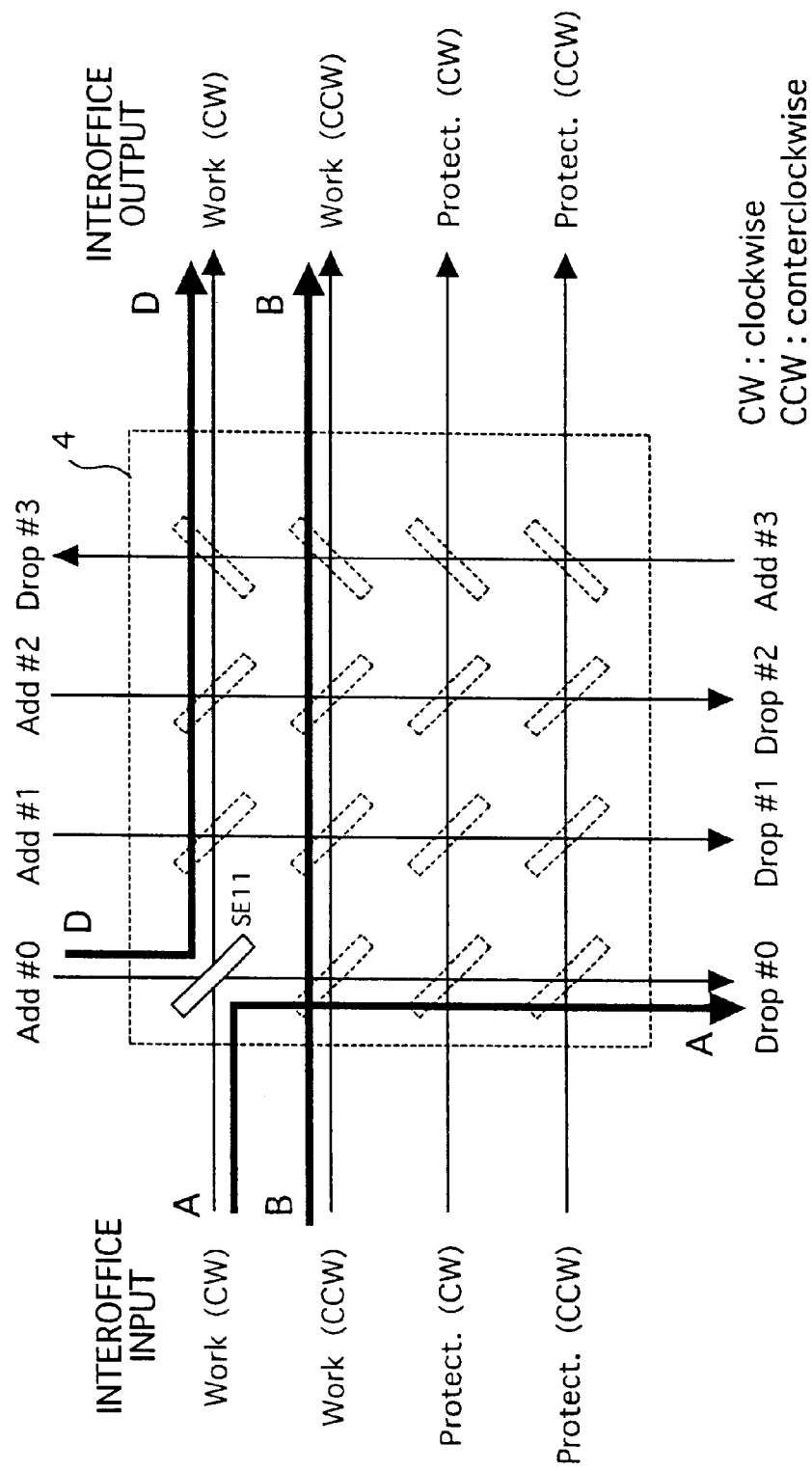
FIG. 8 is a block diagram for illustrating the operation of the switch unit in the initial condition in a node #3 shown in FIG. 4A.

FIG. 8 shows an initial condition of the node #3. At the node #3, the path A is dropped, the path B is passed, and the path D is added to the clockwise work line. Accordingly, only the switch element SE11 is set to the bar state.

Figure 9:
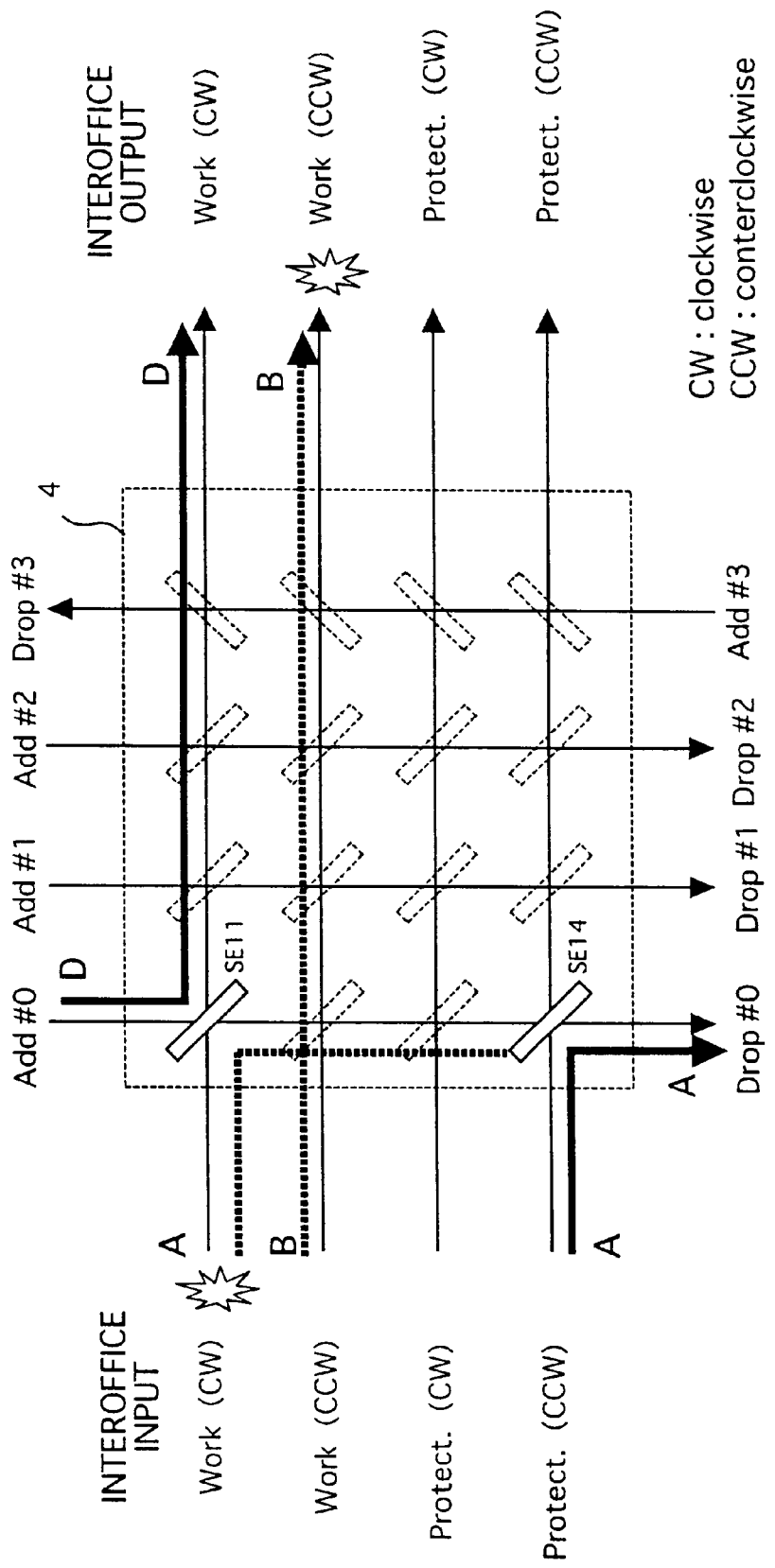
FIG. 9 is a block diagram similar to FIG. 8, showing failure restoration.

FIG. 9 shows a condition of the node #3 after failure restoration. With respect to the node #3, a failure occurs in the path A to be input from the clockwise work line and be dropped at this node. As the restoration from this failure, the signal looped back to the counterclockwise protection line at the node #1 is dropped at the node #3. That is, the switch elements SE11 and SE14 are set to the bar state.

The path B is subjected to the diverse switching between the node #1 and the node #4, so that the path B is not passed through the node #3 after the failure restoration. That is, no signal is input from the path B to the node #3. The path D is not related to this failure, and it is therefore unnecessary to change the condition of each switch element. That is, the initial condition is maintained.

Figure 10:
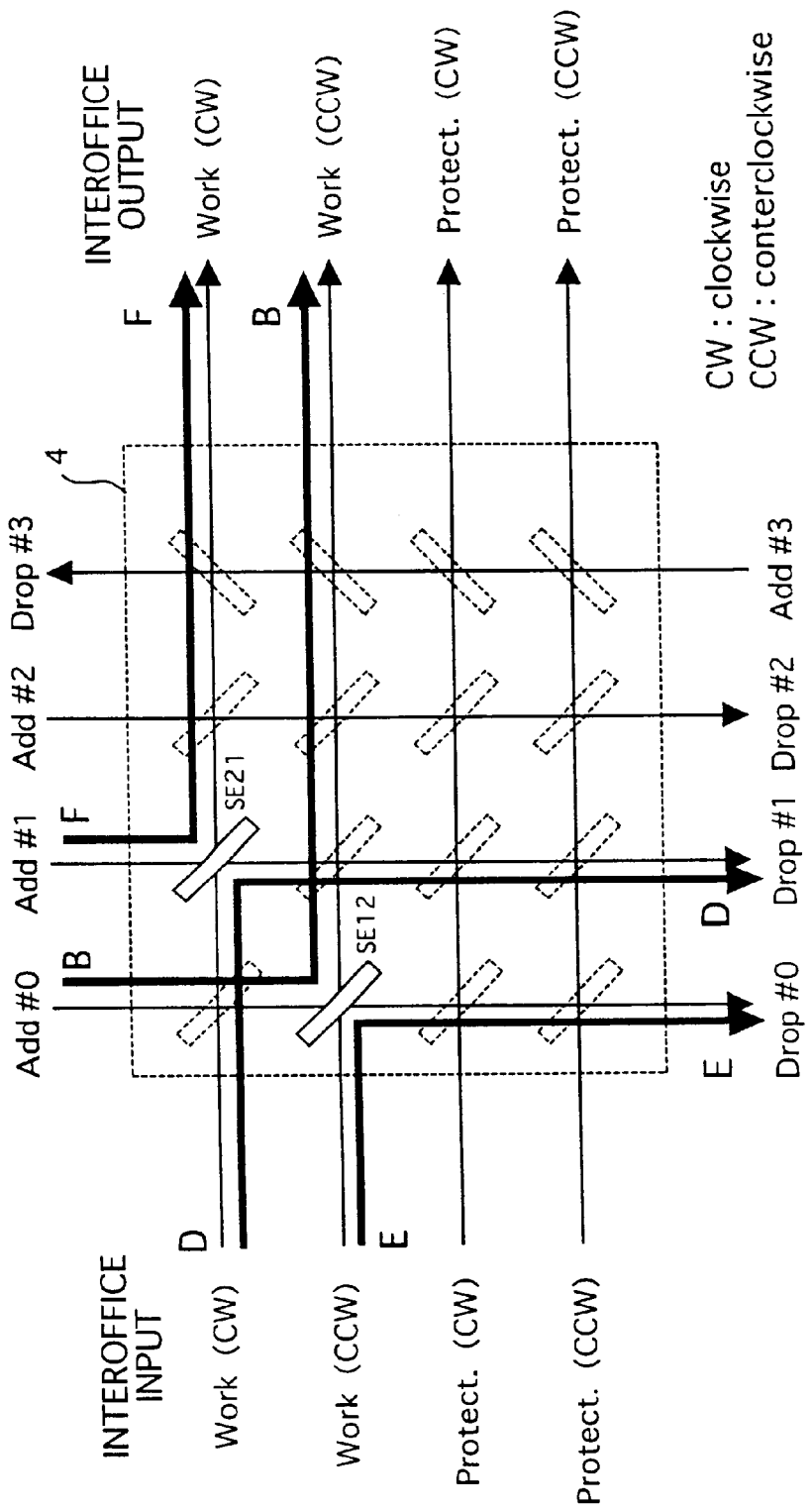
FIG. 10 is a block diagram for illustrating the operation of the switch unit in the initial condition in a node #4 shown in FIG. 4A.

FIG. 10 shows an initial condition of the node #4. At the node #4, the path B is added to the counterclockwise work line, the path F is added to the clockwise work line, and the paths D and E are dropped. In this case, the above path setting can be made only by setting the switch elements SE12 and SE21 to the bar state.

Figure 11:
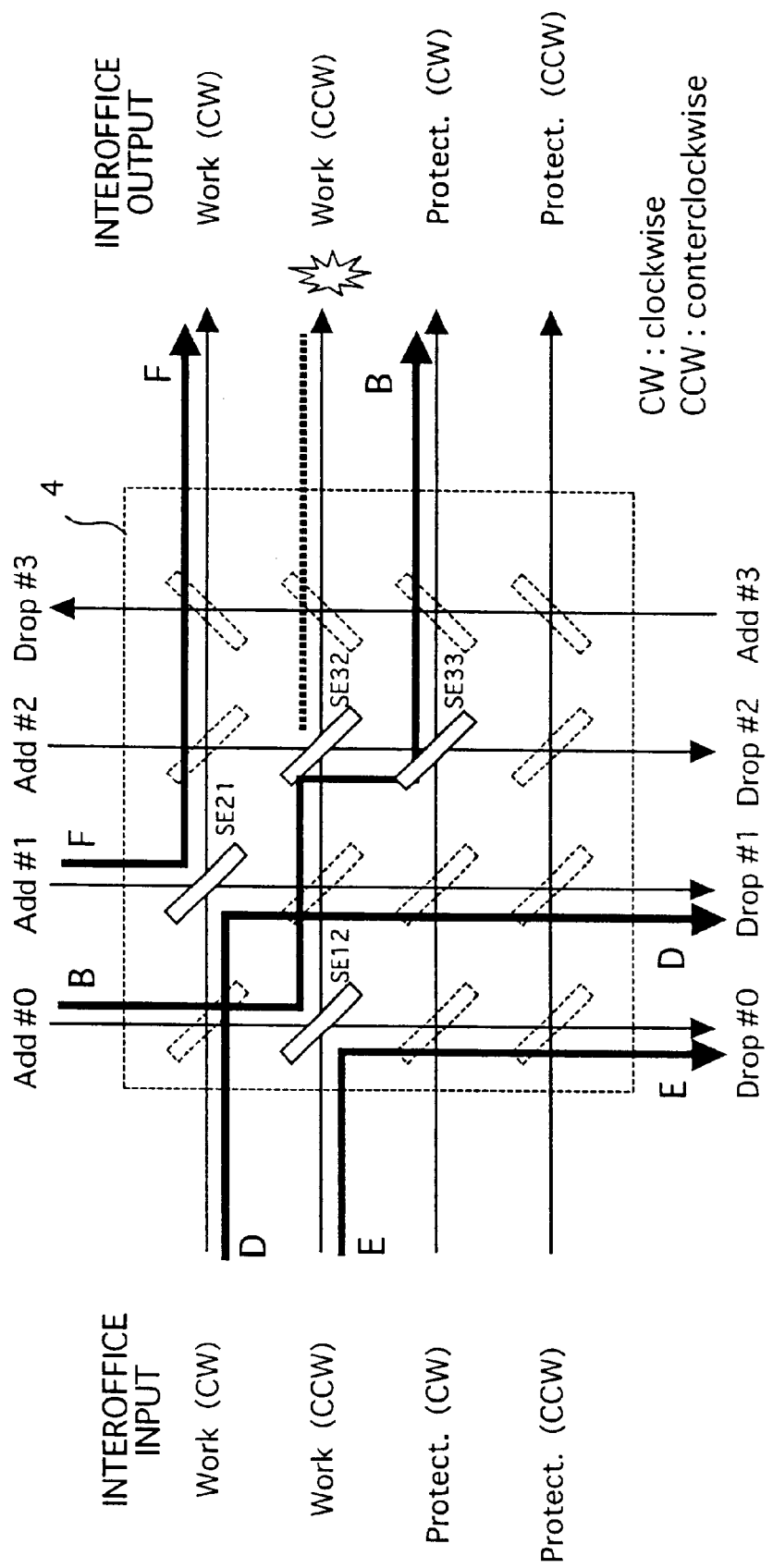
FIG. 11 is a block diagram similar to FIG. 10, showing failure restoration.

FIG. 11 shows a condition of the node #4 after failure restoration. Of the paths handled at the node #4, only the path B is a path related to the failure. With respect to the node #4, the failure occurs in the counterclockwise work line.

The path B is subjected to the diverse switching between the node #4 and the node #1 by switching from the counterclockwise work line to the clockwise protection line. Accordingly, the condition of the switch elements in the node #4 to which the path B is added is changed so as to add the path B to the clockwise protection line. That is, the switch elements SE32 and SE33 are set to the bar state to thereby add the path B to the clockwise protection line. The other paths are not related to this failure, and it is therefore unnecessary to change the state of each switch element.

Figure 12:
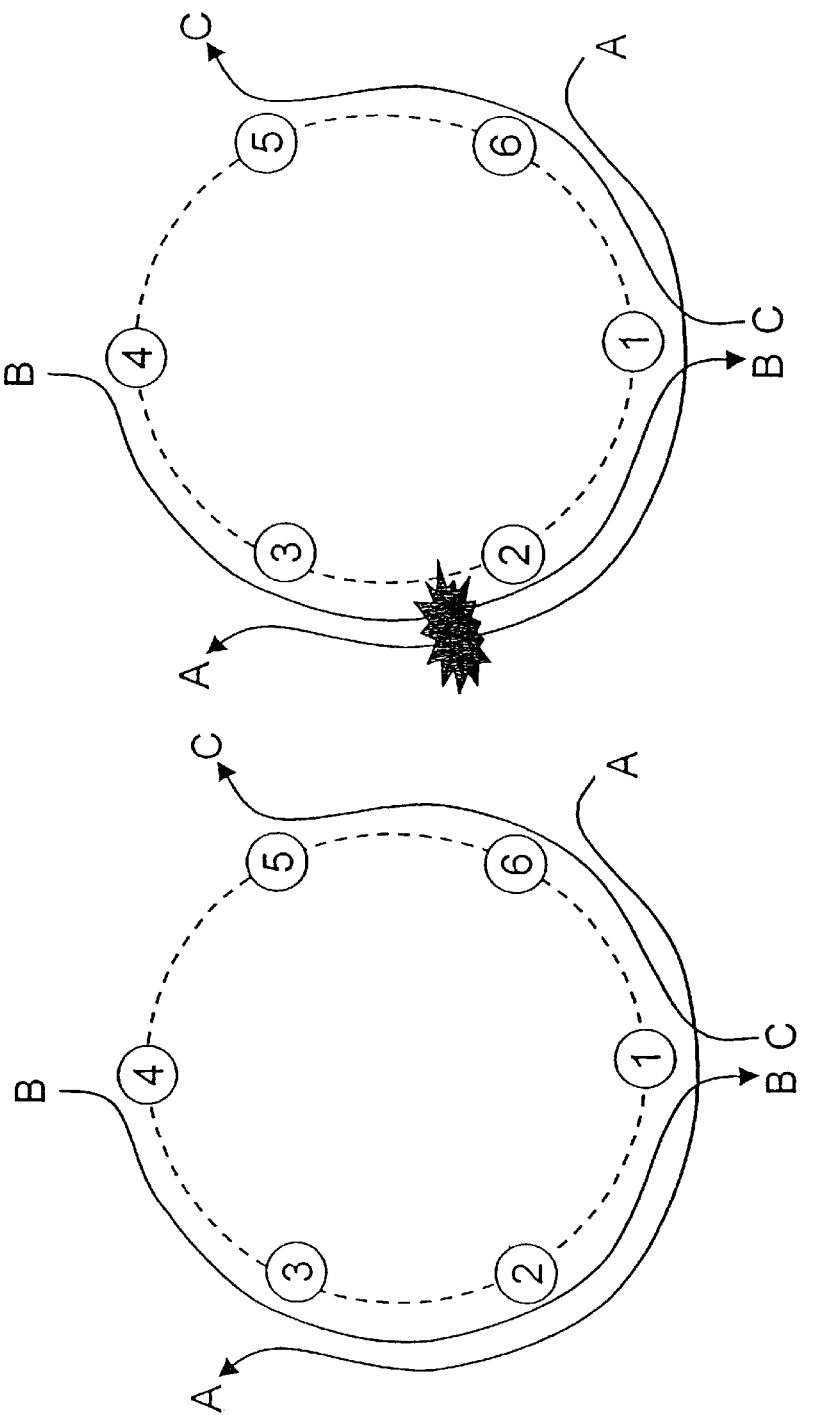
FIG. 12A is a schematic diagram showing the routes of paths set in an initial condition as another example.
FIG. 12B is a schematic diagram showing the occurrence of a failure in the routes shown in FIG. 12A.
Figure 13:
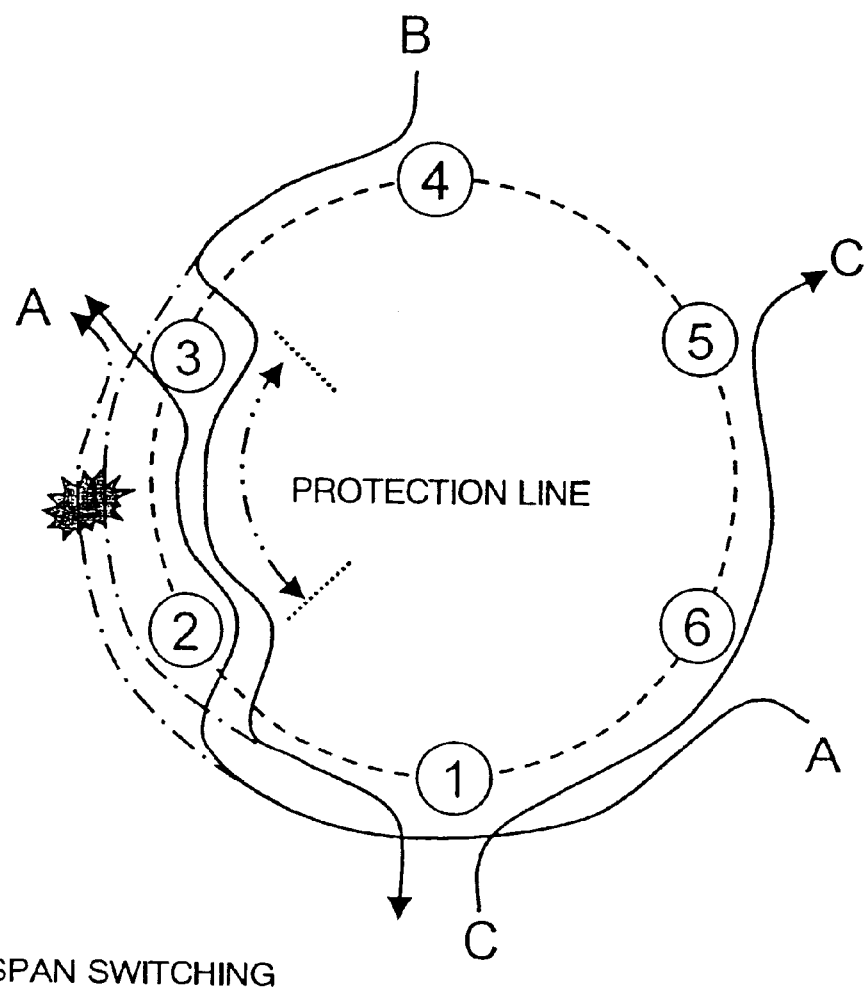
FIG. 13 is a schematic diagram showing the routes of paths after failure restoration from FIG. 12B.

Another example of failure restoration will now be described with reference to FIGS. 12A, 12B, and 13. FIG. 12A shows path setting in an initial condition, FIG. 12B shows a position of failure, and FIG. 13 shows path routing after failure restoration.

As shown in FIG. 12B, it is assumed that a failure occurs between the node #2 and the node #3, and that only the work lines have failed. FIG. 13 shows a condition after failure restoration by passing the failed work lines.

Figure 5:
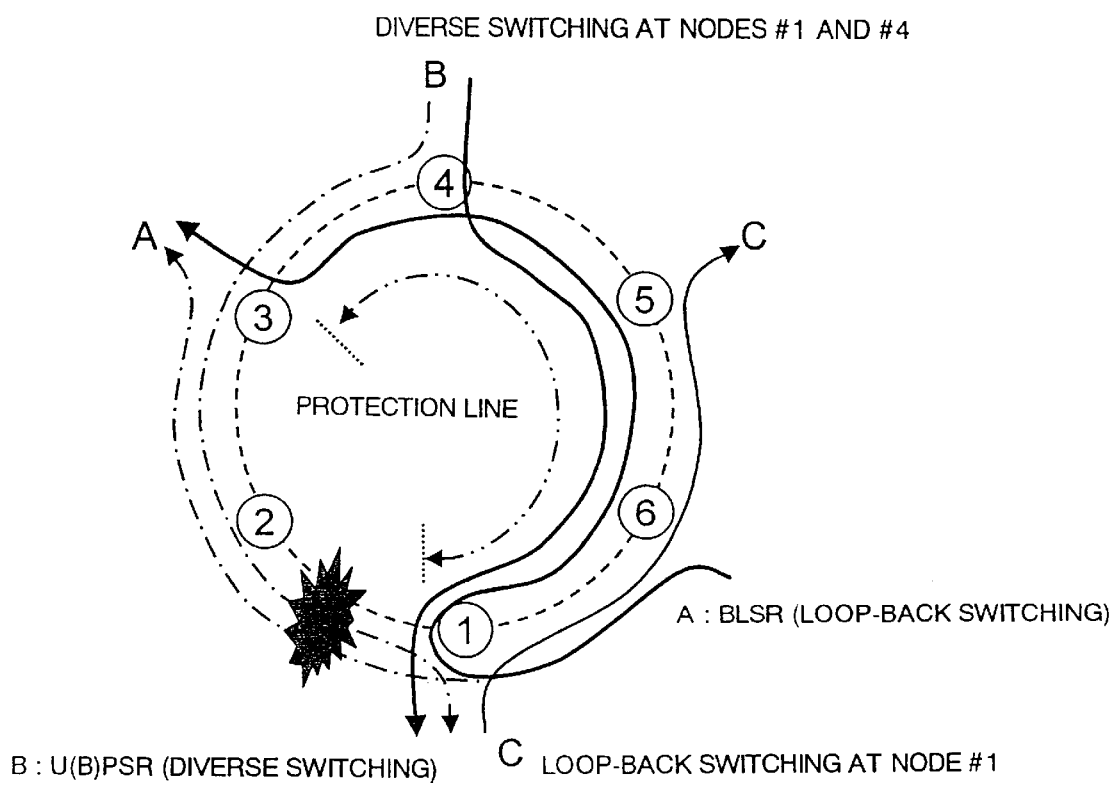
FIG. 5 is a schematic diagram showing the routes of paths after failure restoration from FIG. 4B.

Since the failure occurs in only the work lines, it is not necessary to change the directions of the work lines as in the previous example shown in FIG. 5, but the protection lines present in the same span (between the nodes #2 and #3) can be set as bypassing routes (span switching).

Figure 14:
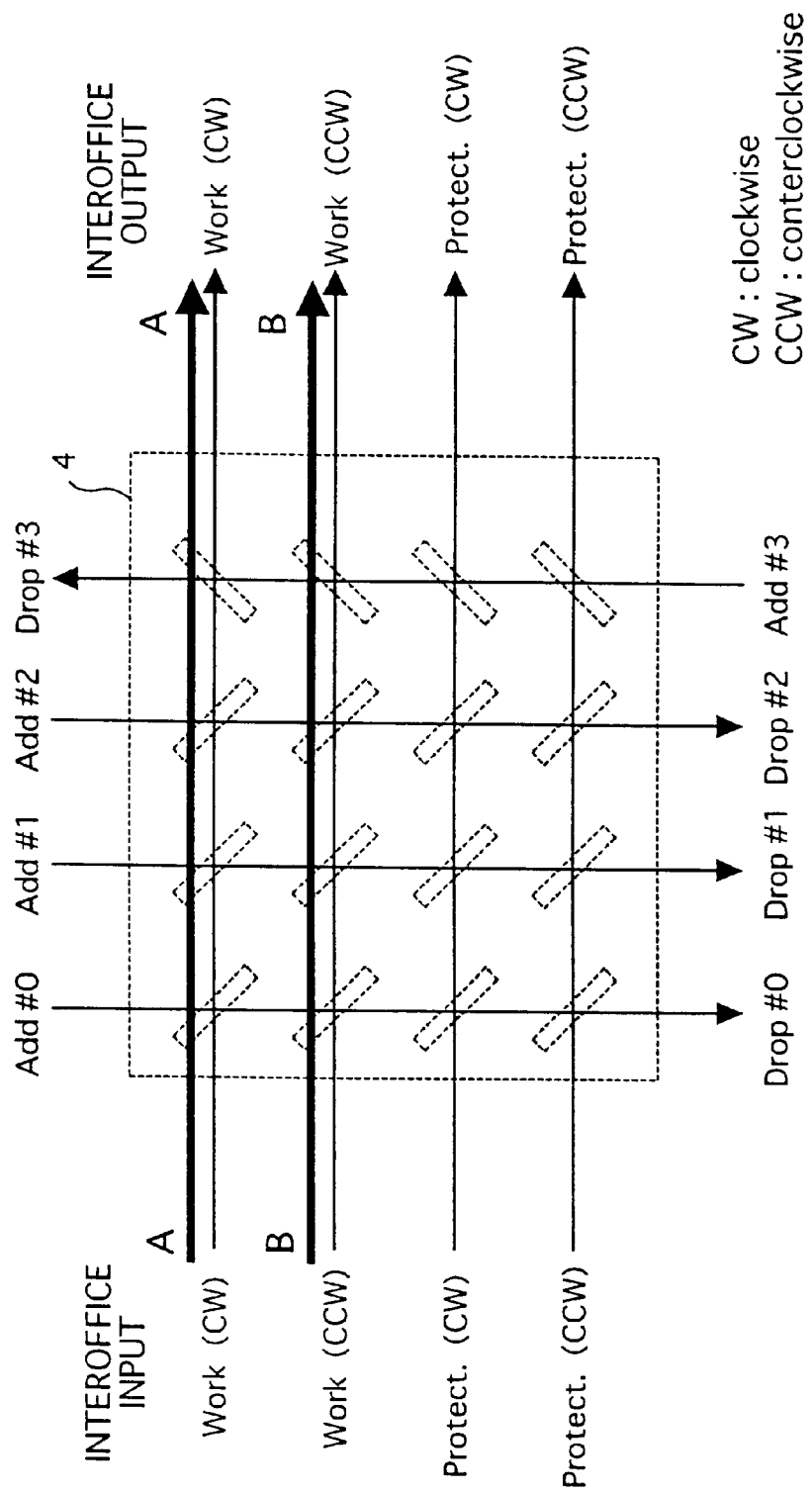
FIG. 14 is a block diagram for illustrating the operation of the switch unit in the initial condition in a node #2 shown in FIG. 12A.

FIG. 14 shows path setting at the node #2 in the initial condition shown in FIG. 12A. Both the path A and the path B are passed through the node #2, and all the switch elements are set to the cross state.

Figure 15:
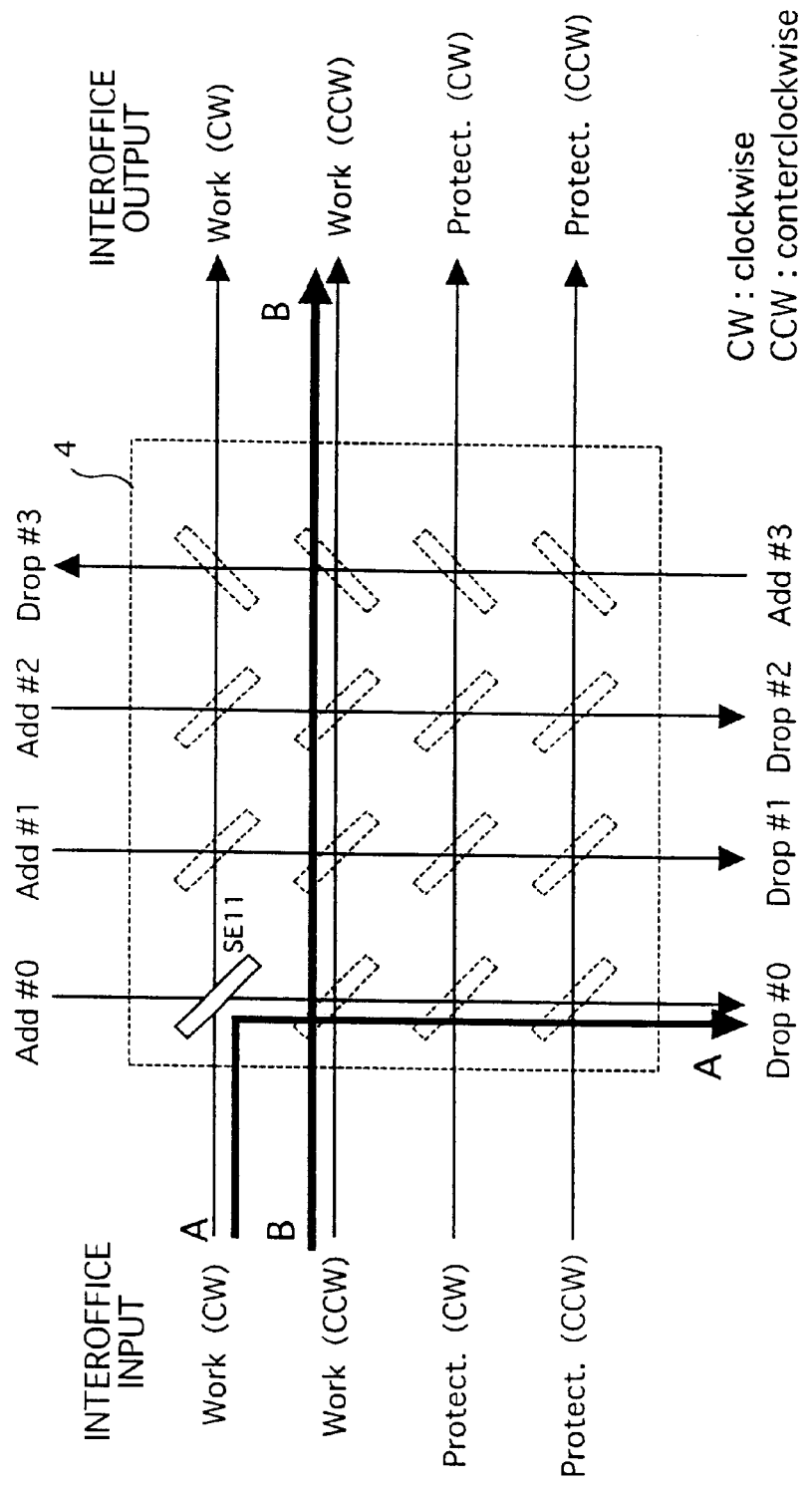
FIG. 15 is a block diagram for illustrating the operation of the switch unit in the initial condition in a node #3 shown in FIG. 12A.

FIG. 15 shows path setting at the node #3 in the initial condition shown in FIG. 12A. The path A is dropped at the node #3, and the path B is passed through the node #3. To drop only the path A, only the switch element SE11 is set to the bar state, and the other switch elements are set to the cross state.

Figure 16:
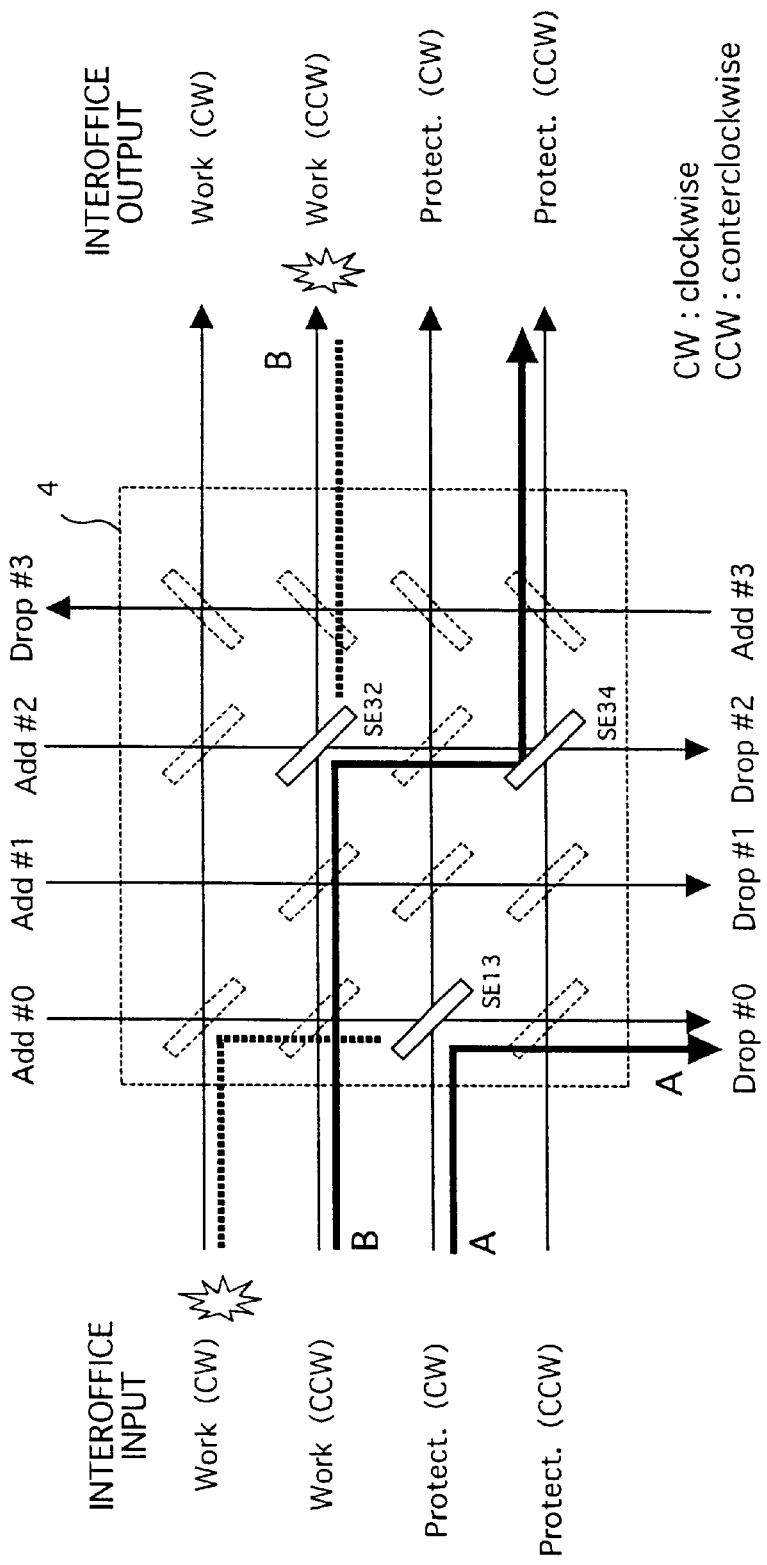
FIG. 16 is a block diagram similar to FIG. 15, showing failure restoration.

FIG. 16 shows path switching at the node #3 after failure restoration. A failure occurs in the path A, so that a signal from the clockwise work line is not input to the node #3. As the restoration from this failure, the path A is switched from the clockwise work line to the clockwise protection line at the node #2. Accordingly, a signal from the clockwise protection line is dropped at the node #3. To this end, the switch element SE13 is set to the bar state.

Further, a failure occurs also in the path B on the counterclockwise work line as the output from the node #3. As the restoration from this failure, the switch elements SE32 and SE34 are set to the bar state, so as to output a signal from the counterclockwise work line to the counterclockwise protection line.

Figure 17:
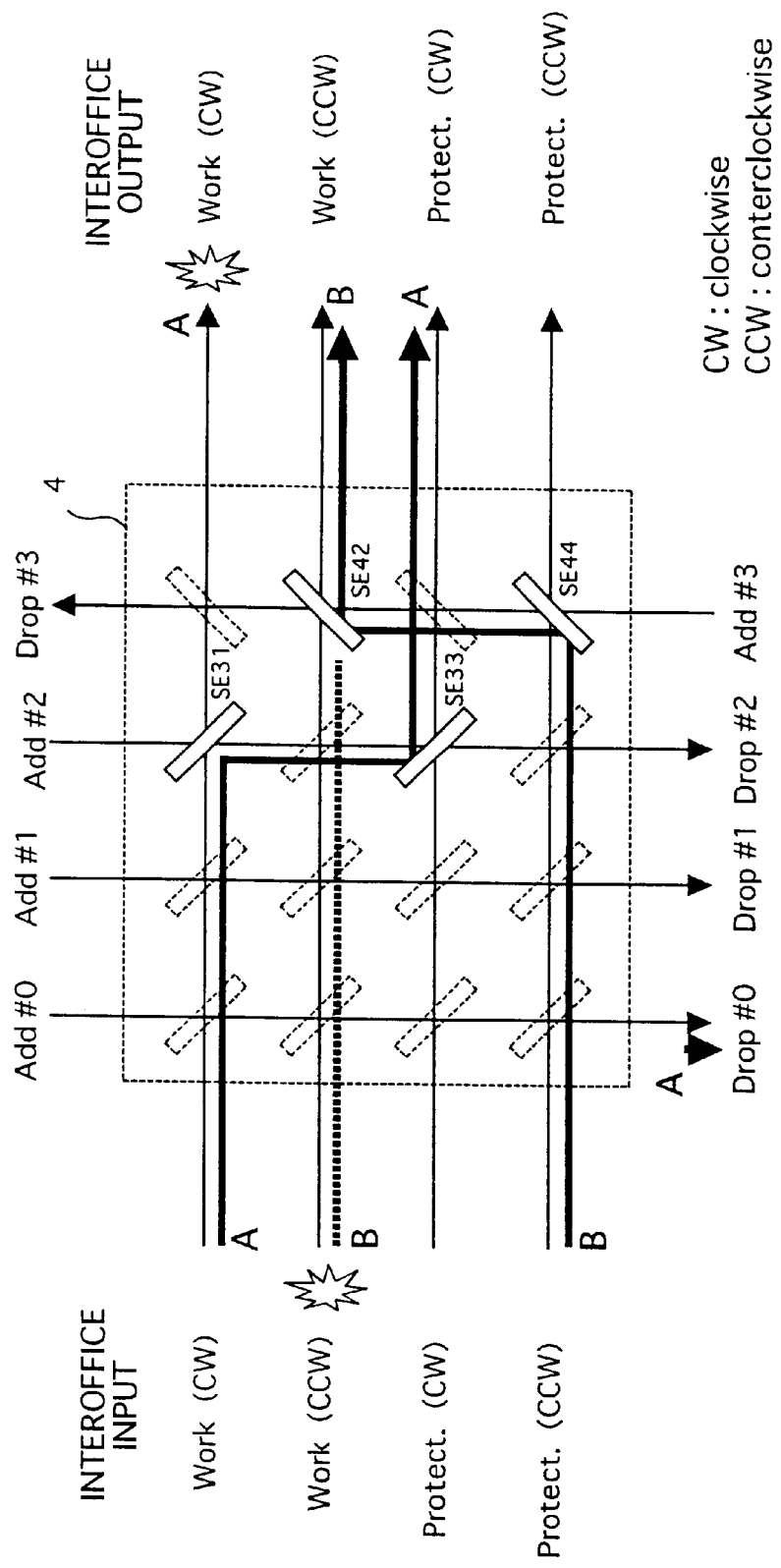
FIG. 17 is a block diagram similar to FIG. 14, showing failure restoration.

FIG. 17 shows path switching at the node #2 after failure restoration. A failure occurs in the path B, so that a signal from the counterclockwise work line is not input to the node #2. As the restoration from this failure, the path B is switched from the counterclockwise work line to the counterclockwise protection line at the node #3. Accordingly, a signal from the counterclockwise protection line is input to the node #2. Since no failure occurs on the downstream side of the node #2 (in respect to the path B), the input signal from the counterclockwise protection line is returned to the counterclockwise work line. To this end, the switch elements SE44 and SE42 are changed to the bar state.

Further, a failure occurs also in the path A on the clockwise work line as the output from the node #2. As the restoration from this failure, the clockwise work line is switched to the clockwise protection line at the node #2. To this end, the switch element SE33 is changed to the bar state.

Some examples of an optical add/drop device in the prior art will now be described, because it is useful in understanding the superiority of the present invention.

Figure 18:
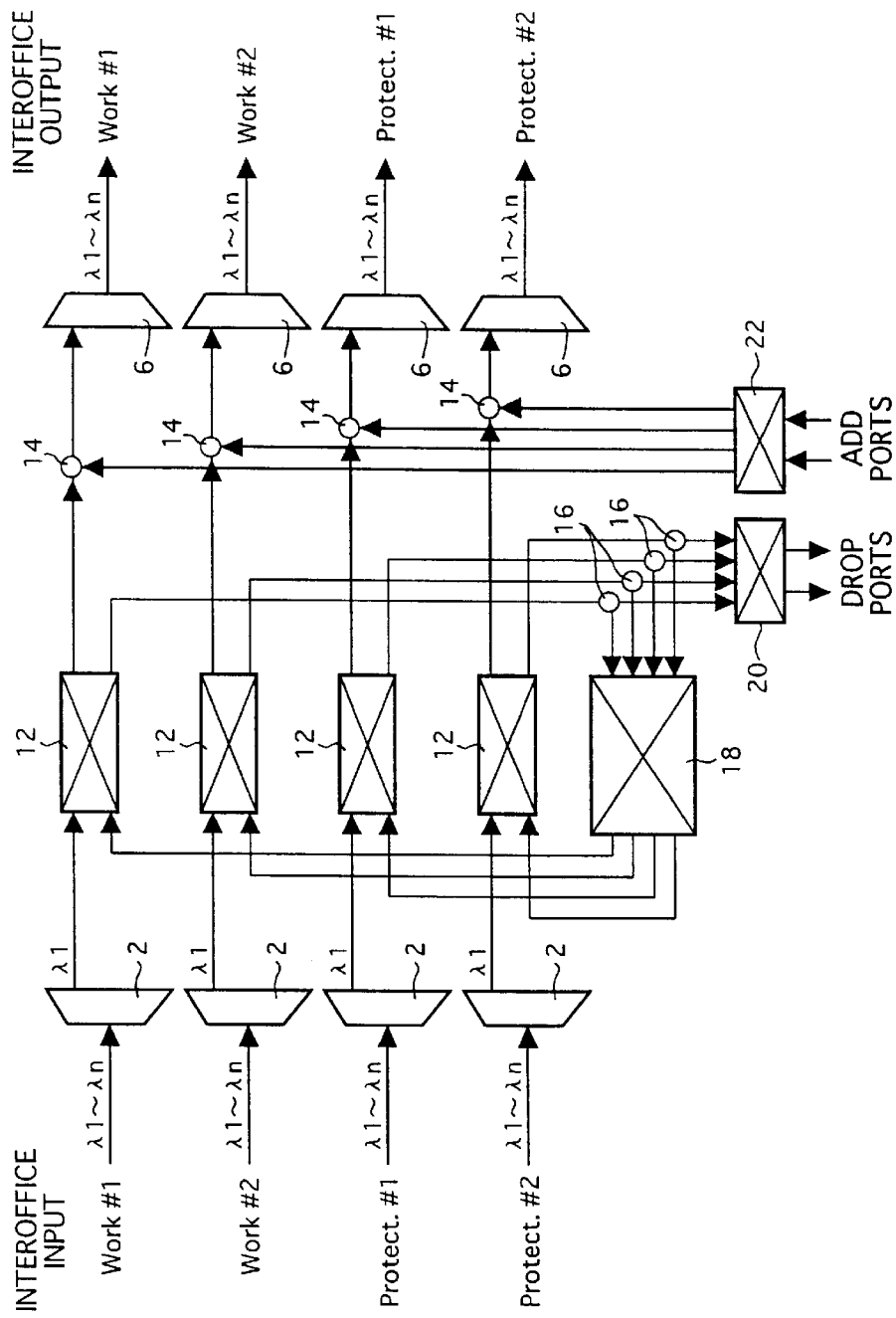
FIG. 18 is a block diagram of an optical add/drop device in the prior art.

FIG. 18 is a block diagram of an optical add/drop device in the prior art. When WDM signal light is supplied from each line, the WDM signal light is separated into optical signals having wavelengths $\lambda_1$ to $\lambda_n$ by each optical demultiplexer 2. Each optical signal is input into a 2×2 crosspoint switch 12 provided per interoffice line. A signal to be passed through this node is passed through the 2×2 crosspoint switch 12, and output through each optical multiplexer 6 to the corresponding line.

A signal to be protected or dropped is dropped from the 2×2 crosspoint switch 12, and split into two components by a 1×2 optical coupler 16. One of the two components is input into a 4×4 crosspoint switch 18, and the other is input into a 4×2 switch 20.

In performing failure restoration, the 4×4 crosspoint switch 18 switches the routes of input signals to protect the signals by loop-back switching or span switching. That is, a signal output from the 4×4 crosspoint switch 18 is input again to the corresponding 2×2 crosspoint switch 12, and next output to a desired line.

In the 4×2 switch 20, a drop signal from an arbitrary line is selected and supplied to a given office. Further, an add signal is added through a 2×1 coupler 14 to a desired line by a 2×4 switch 22.

Figure 19A:
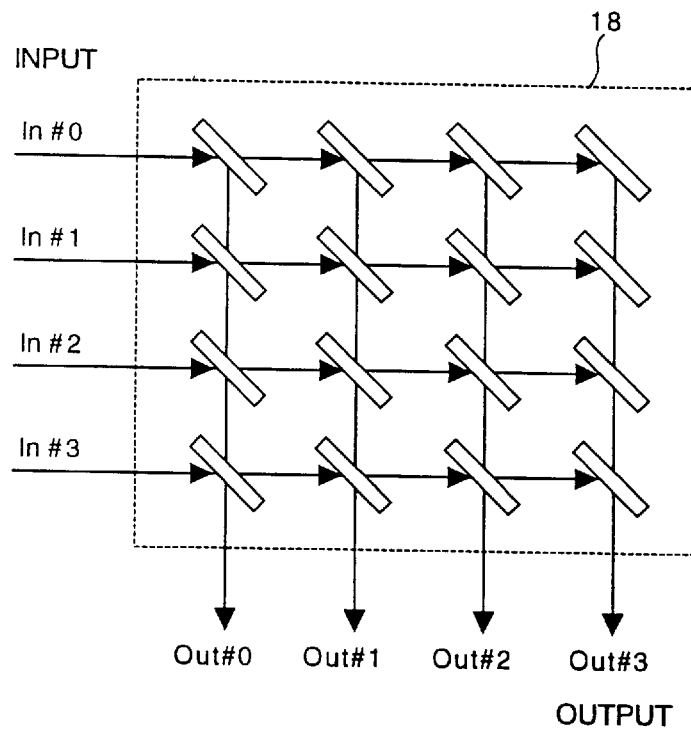
FIG. 19A is a block diagram showing a 4×4 crosspoint switch shown in FIG. 18.
Figure 19B:
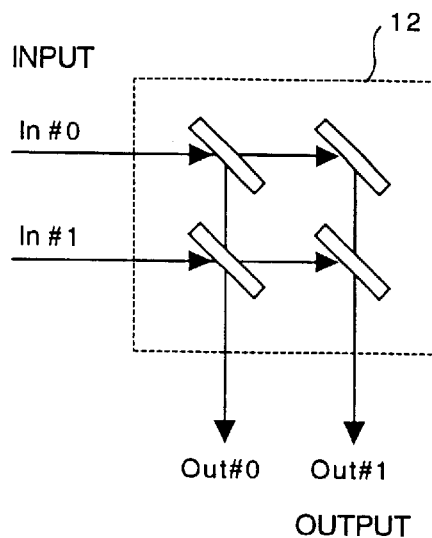
FIG. 19B is a block diagram showing a 2×2 crosspoint switch shown in FIG. 18.

Referring to FIGS. 19A and 19B, there are shown the arrangement of switch elements in the 4×4 crosspoint switch 18 and the arrangement of switch elements in the 2×2 crosspoint switch 12, respectively. In the 4×4 crosspoint switch 18, 16 switch elements are required. In the 2×2 crosspoint switch 12, four switch elements are required.

Accordingly, in the optical add/drop device shown in FIG. 18, four 2×2 crosspoint switches 12, one 4×4 crosspoint switch 18, one 4×2 switch 20, and one 2×4 switch 22 are required per wavelength channel. Accordingly, 48 switch elements are totally required per wavelength channel. Furthermore, eight couplers are totally required per wavelength channel.

Figure 20:
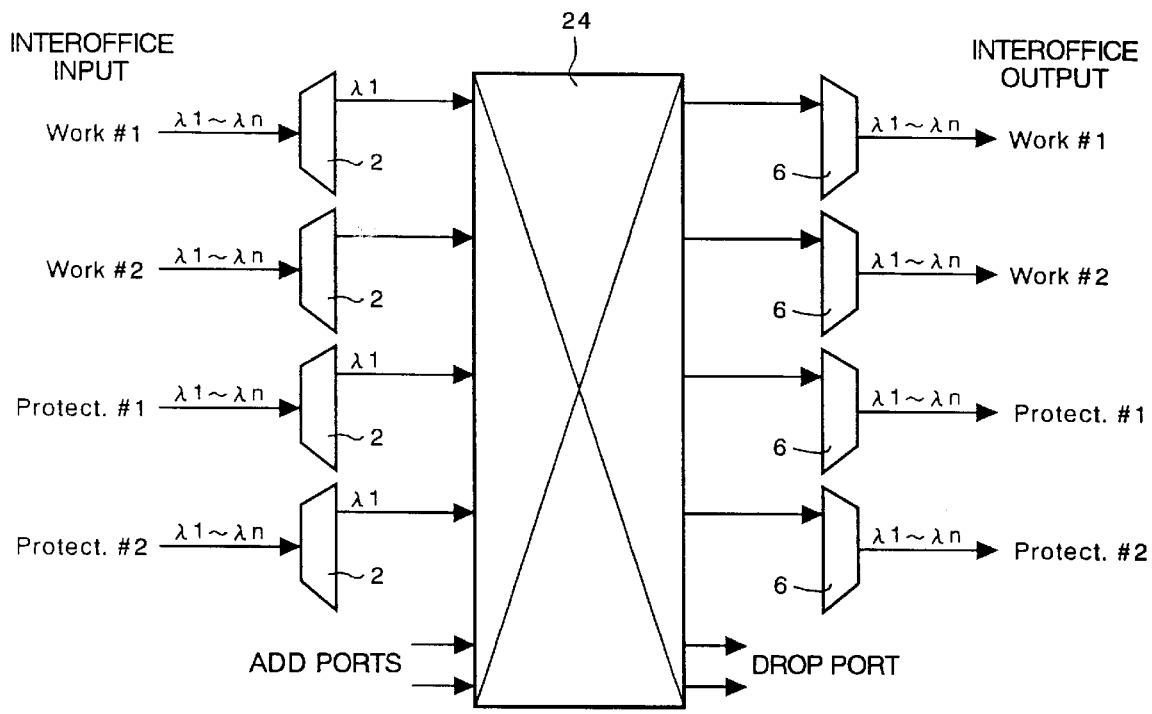
FIG. 20 is a block diagram of another optical add/drop device in the prior art.

FIG. 20 is a block diagram of another optical add/drop device in the prior art. In this device, a 6×6 crosspoint switch 24 is employed, and add ports and drop ports are also connected directly to the 6×6 crosspoint switch 24. In this case, 36 switch elements are required per wavelength channel.

Although not shown, in the case of utilizing protection lines as extra traffic, additional add ports for protect channel access are provided in parallel to the add ports shown in FIG. 20, and additional drop ports for protect channel access are provided in parallel to the drop ports shown in FIG. 20. Accordingly, an 8×8 crosspoint switch is required in place of the 6×6 crosspoint switch shown in FIG. 20. In this case, 64 switch elements are required per wavelength channel.

To the contrary, only 16 switch elements are required in the switch unit 4 per wavelength channel according to the present invention. Thus, failure restoration or the like can be easily performed with a simple configuration.

Figure 21:
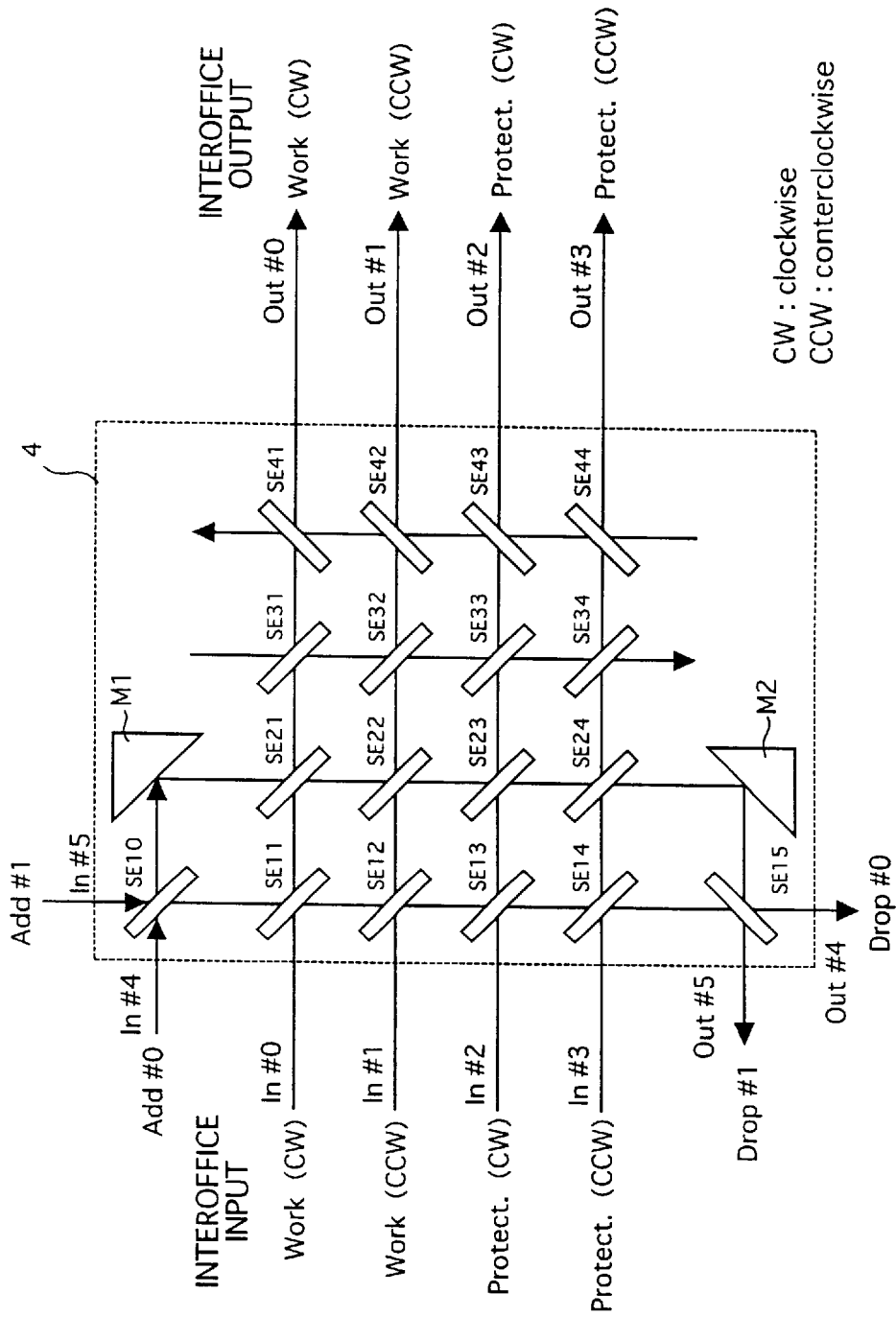
FIG. 21 is a block diagram showing a third preferred embodiment of the switch unit.

FIG. 21 is a block diagram showing a third preferred embodiment of the switch unit 4. In this preferred embodiment, a switch element SE10 is opposed to the upper side of the switch element SE11 with the same direction of inclination, and a switch element SE15 is opposed to the lower side of the switch element SE14 with the direction of inclination reversed to that of the switch element SE14.

Further, a mirror M1 is opposed to the upper side of the switch element SE21, so as to connect the switch element SE10 and the switch element SE21. Similarly, a mirror M2 is opposed to the lower side of the switch element SE24, so as to connect the switch element SE15 and the switch element SE24.

An input port In #4 and an input port In #5 are set on the left side and the upper side of the switch element SE10, respectively. An add line Add #0 and an add line Add #1 from a given office are connected to the input port In #4 and the input port In #5, respectively.

An output port Out #4 and an output port Out #5 are set on the lower side and the left side of the switch element SE15, respectively. The output port Out #4 and the output port Out #5 are connected to a drop line Drop #0 and a drop line Drop #1 to a given office, respectively.

With this configuration, by changing the state of the switch element SE10, two add signals can be easily switched without operating the other elements. Further, by changing the state of the switch element SE15, two drop signals can be easily switched without operating the other elements.

Figure 22:
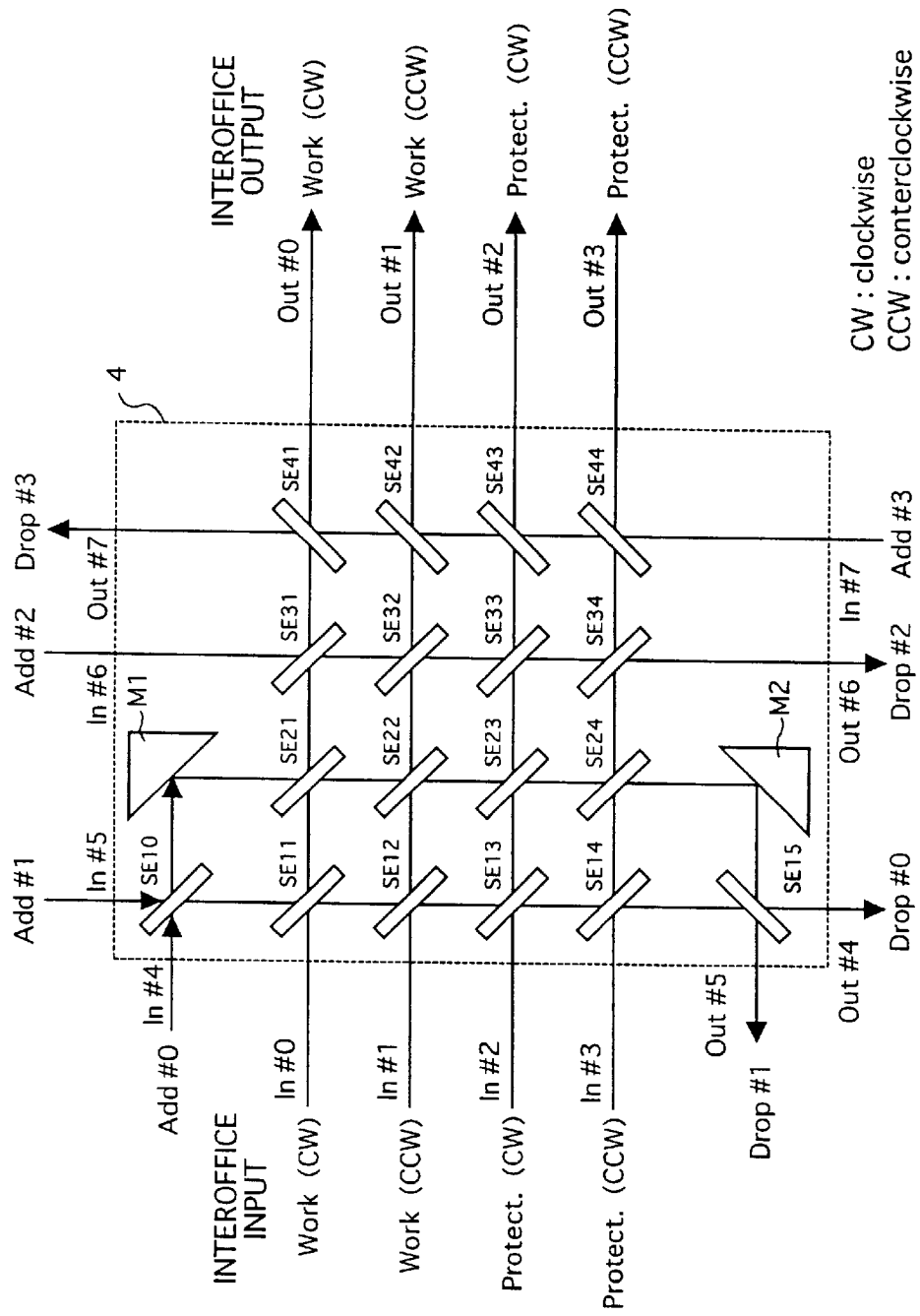
FIG. 22 is a block diagram showing a fourth preferred embodiment of the switch unit.

FIG. 22 is a block diagram showing a fourth preferred embodiment of the switch unit 4. As in the preferred embodiment shown in FIG. 3, an input port In #6 and an output port Out #6 for extra traffic are provided in relation to the switch elements SE31 to SE34 in the third column, and an input port In #7 and an output port Out #7 for extra traffic are provided in relation to the switch elements SE41 to SE44 in the fourth column. The other configuration is similar to that of the preferred embodiment shown in FIG. 21.

Figure 23:
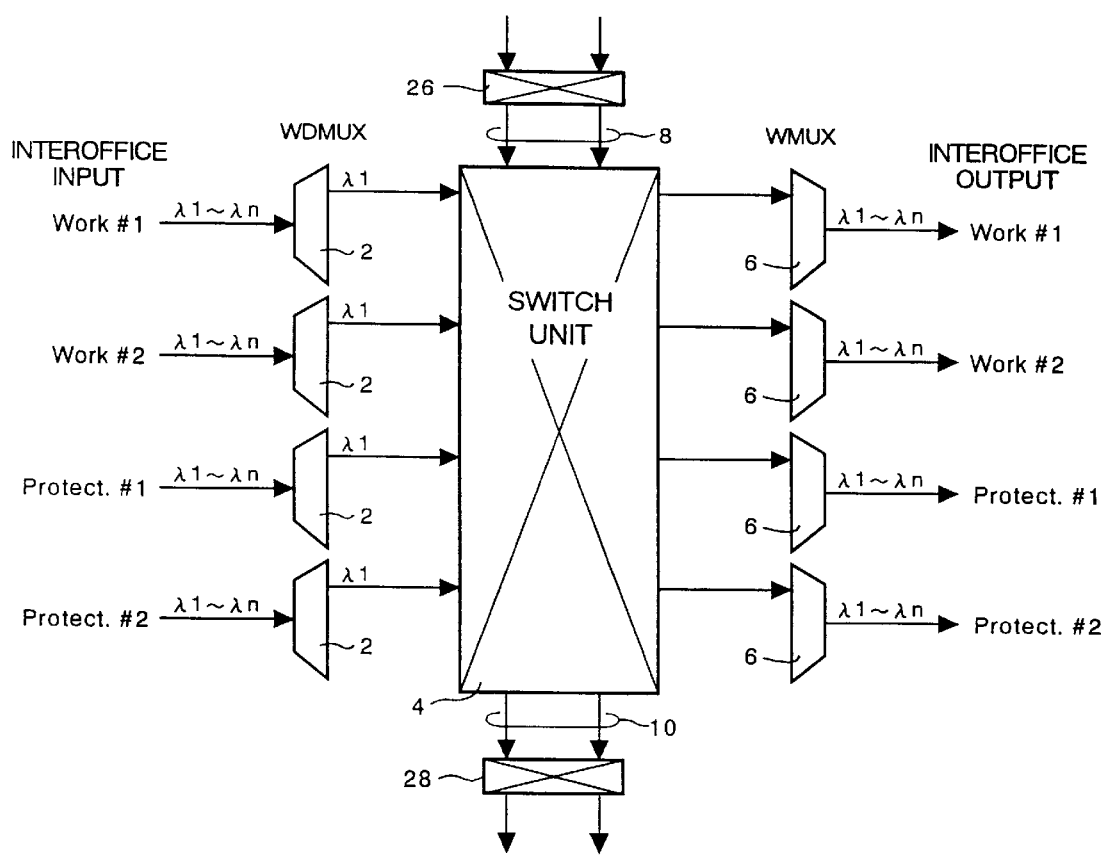
FIG. 23 is a block diagram showing a second preferred embodiment of the optical add/drop device according to the present invention.

FIG. 23 is a block diagram showing a second preferred embodiment of the optical add/drop device according to the present invention. In contrast to the first preferred embodiment shown in FIG. 1, the second shown in FIG. 23 is characterized in that an add selector 26 is provided at the add ports 8 of the switch unit 4, and that a drop selector 28 is provided at the drop ports 10 of the switch unit 4.

Figure 24:
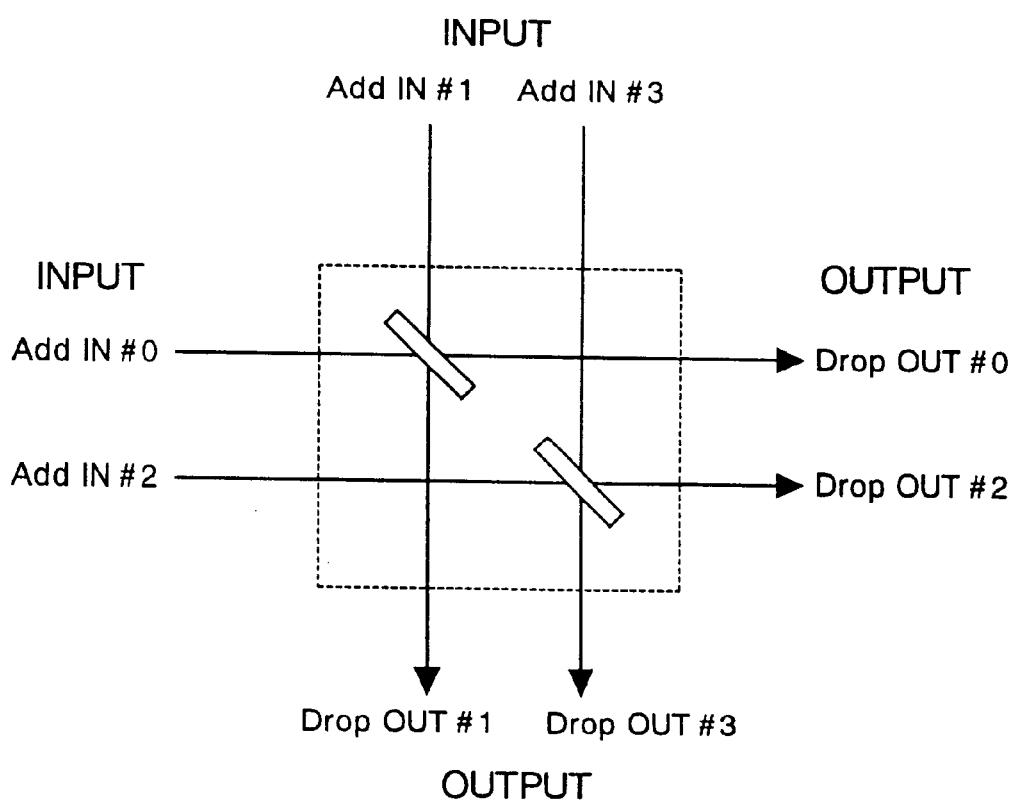
FIG. 24 is a block diagram showing the configuration of a dual 2×2 add/drop selector applicable to FIG. 23.

FIG. 24 shows a preferred embodiment of a dual 2×2 add/drop selector usable as the add selector 26 and/or the drop selector 28 shown in FIG. 23. In this preferred embodiment, two 2×2 switch elements are arranged on 2×2 crosspoints to configure a dual 2×2 switch. By connecting the outputs or inputs of this dual 2×2 switch to the add ports 8 or the drop ports 10 of the switch unit 4 shown in FIG. 23, arbitrary switching of signals between the add ports 8 or between the drop ports 10 can be performed.

Figure 25:
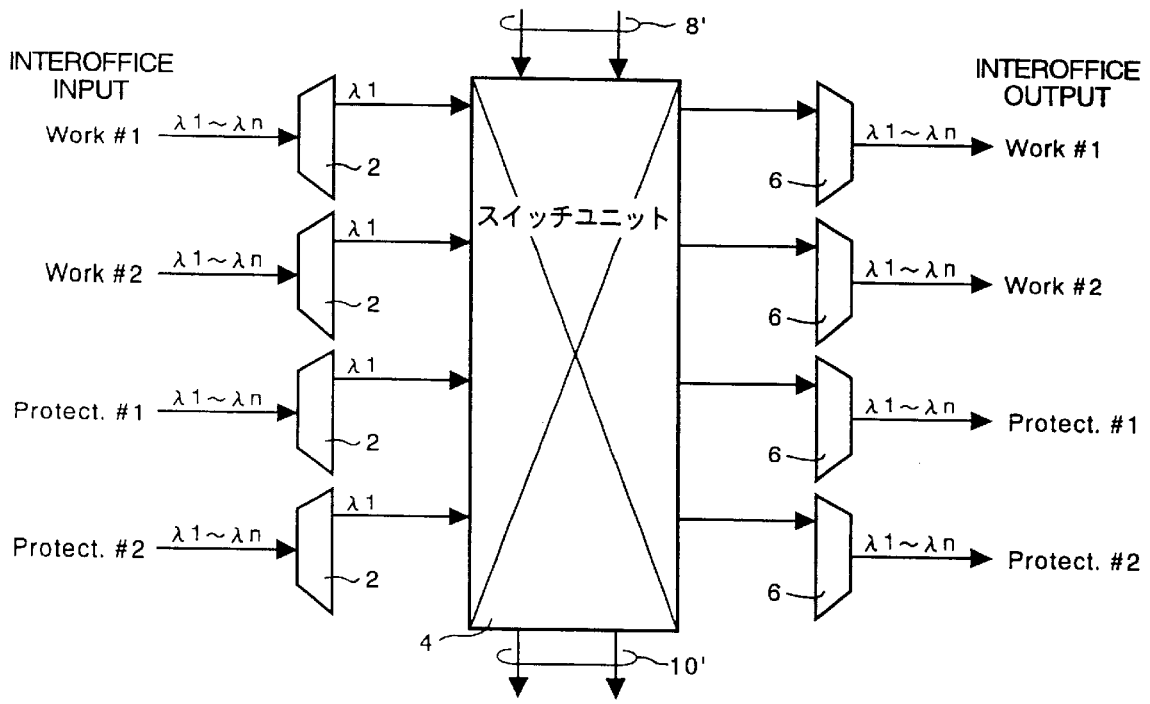
FIG. 25 is a block diagram showing a third preferred embodiment of the optical add/drop device according to the present invention.

FIG. 25 is a block diagram showing a third preferred embodiment of the optical add/drop device according to the present invention. In this preferred embodiment, add/drop ports 8' are provided on one side of the switch unit 4, and add/drop ports 10' are provided on the other side of the switch unit 4 opposite to the add/drop ports 8', in order to facilitate bidirectional communications. A specific wiring form of the configuration shown in FIG. 25 is shown in FIG. 26.

Figure 26:
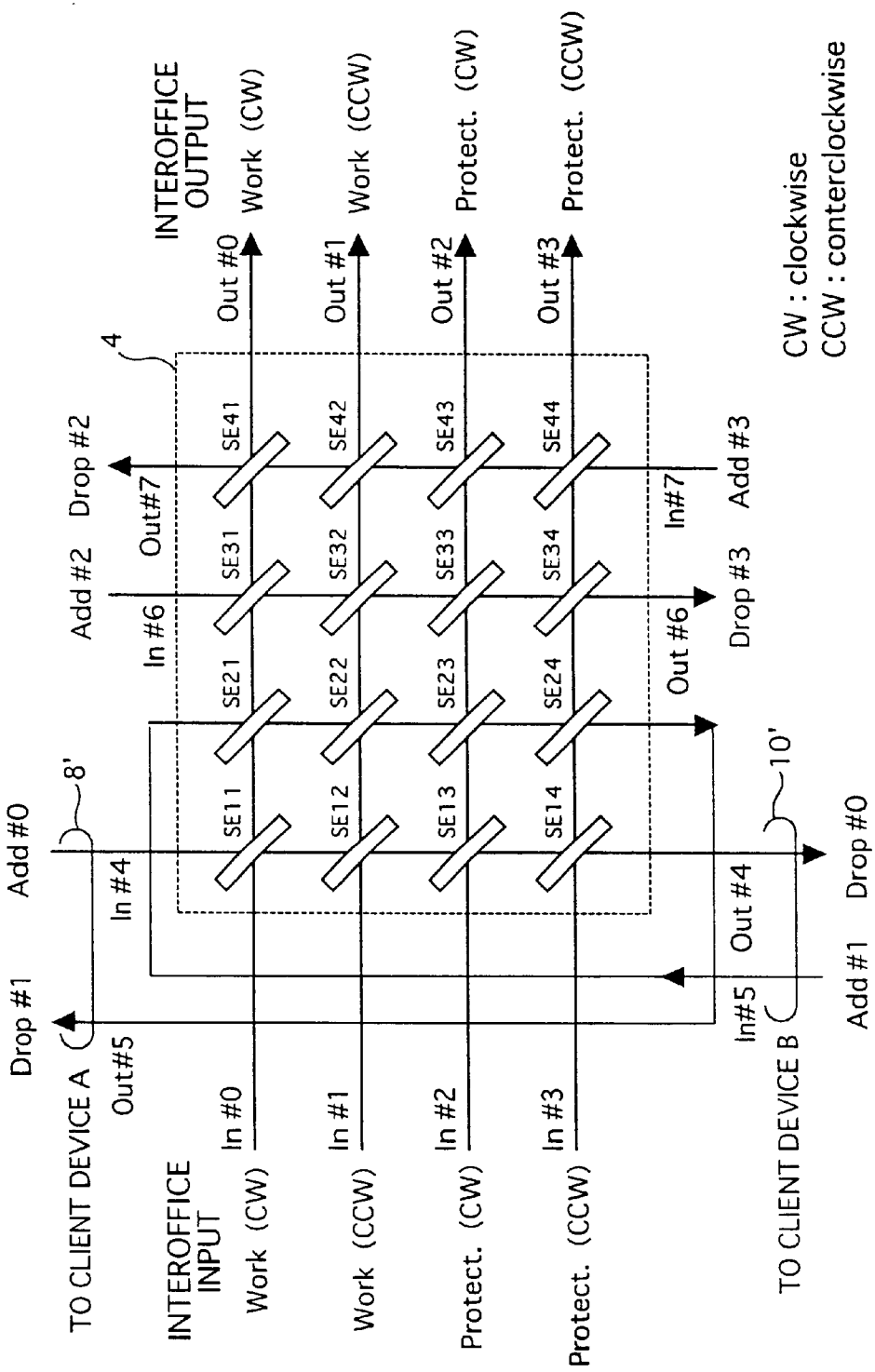
FIG. 26 is a block diagram showing a wiring condition in a switch unit shown in FIG. 25.

FIG. 26 shows a switch unit 4 applicable to the preferred embodiment shown in FIG. 25. For example, in the case of connecting the add/drop ports 8' to a client device A, an add line Add #0 and a drop line Drop #1 are used as a pair, and in the case of connecting the add/drop ports 10' to another client device B, a drop line Drop #0 and an add line Add #1 are used as a pair.

In carrying out the present invention, a mirror using MEMS (Micro Electro Mechanical System) or a reflection switch using a bubble may be preferably used as each switch element, so as to facilitate a reduction in size of the switch unit. By adopting these optical switches, the optical add/drop device can be reduced in size and can be easily controlled.

The switch unit may be configured by integrating Mach-Zehnder optical switches using a semiconductor substrate or a dielectric substrate such as $LiNbO_3$.

According to the present invention as described above, it is possible to provide an optical add/drop device which can easily perform failure restoration with a simple configuration.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical add/drop device applicable to an optical fiber network, comprising:

a plurality of 2×2 switch elements provided on crosspoints arranged in the form of a matrix, each of said switch elements switching between a bar state and a cross state, sixteen of said switch elements being arranged on said matrix such that only said sixteen of said switch elements are required for each wavelength channel;

input/output ports provided on the rows of said matrix and connected to said optical fiber network; and add/drop ports provided on the columns of said matrix.

2. An optical add/drop device according to claim 1, wherein said matrix comprises a 4×4 matrix.

3. An optical add/drop device according to claim 2, wherein said add/drop ports comprise:

two add input ports opposed to said switch elements in the first row, the first column and in the first row, the second column; and two drop output ports opposed to said switch elements in the fourth row, the first column and in the fourth row, the second column.

4. An optical add/drop device applicable to an optical fiber network, comprising:

a plurality of 2×2 switch elements provided on crosspoints arranged in the form of a matrix, each of said switch elements switching between a bar state and a cross state, only sixteen of said switch elements being required for each wavelength channel;

input/output ports provided on the rows of said matrix and connected to said optical fiber network; and add/drop ports provided on the columns of said matrix, wherein said matrix comprises a 4×4 matrix, and wherein:

said optical fiber network comprises a first work line, a second work line opposite in direction of said first work line, a first protection line, and a second protection line opposite in direction to said first protection line;

said input/output port comprise:

four input ports opposed to said switch elements in the first row, the first column, in the second row, the first column, in the third row, the first column, and in the fourth row, the first column, and connected to said first work line, said second work line, said first protection line, and said second protection line, respectively; and four output ports opposed to said switch elements in the first row, the fourth column, in the second row, the fourth column, in the third row, the fourth column, and in the fourth row, the fourth column, and connected to said first work line, said second work line, said first protection line, and said second protection line, respectively; and all of said switch elements in the first, second, and third columns are oriented in a first direction, and all of said switch elements in the fourth column are oriented in a second direction different from said first direction.

5. An optical add/drop device applicable to an optical fiber network for propagating WDM signal light obtained by wavelength division multiplexing a plurality of optical signals having different wavelengths, comprising:

an optical demultiplexer and an optical multiplexer for relating said optical fiber network to a plurality of wavelength channels; and a plurality of switch units provided so as to respectively correspond to said plurality of wavelength channels;

each of said switch units comprising:

a plurality of 2×2 switch elements provided on crosspoints arranged in the form of a matrix, each of said switch elements switching between a bar state and a cross state, sixteen of said switch elements being arranged on said matrix such that only said sixteen of said switch elements are required for each of said wavelength channels;

input/output ports provided on the rows of said matrix and connected to said optical fiber network; and add/drop ports provided on the columns of said matrix.

6. An optical add/drop device according to claim 4, wherein said add/drop ports comprise:

two add input ports opposed to said switch elements in this first row, the first column and in the first row, the second column; and two drop output ports opposed to said switch elements in the fourth row, the first column and in the fourth row, the second column.

7. An optical add/drop device applicable to an optical fiber network, related to a plurality of wavelength channels the device comprising:

at least one switch unit consisting of sixteen 2×2 switch elements provided on crosspoints arranged in the form of a matrix, each of said switch elements switching between a bar state and a cross state, said sixteen switch elements being required for a respective wavelength channel;

input/output provided on the rows of said matrix and connected to said optical fiber network; and add/drop ports provided on the columns of said matrix.

8. An optical add/drop device applicable to an optical fiber network for propagating WDM signal light obtained by wavelength division multiplexing a plurality of optical signals having different wavelengths, comprising:

an optical demultiplexer and an optical multiplexer for relating said optical fiber network to a plurality of wavelength channels; and a plurality of switch units provided so as to respectively correspond to said plurality of wavelength channels;

each of said switch units consisting of sixteen 2×2 switch elements provided on crosspoints arranged in the form of a matrix, each of said switch elements switching between a bar state and a cross state, said sixteen switch elements being required for a respective one of said wavelength channels;

input/output ports provided on the rows of said matrix and connected to said optical fiber network; and add/drop ports provided on the columns of said matrix.

9. An optical add/drop device according to claim 7, wherein matrix is a 4×4 matrix.

* * * * *